United States Patent
Liao et al.

(10) Patent No.: US 9,429,737 B2
(45) Date of Patent: *Aug. 30, 2016

(54) OPTICAL IMAGE LENS SYSTEM

(71) Applicant: LARGAN PRECISION CO., LTD., Taichung (TW)

(72) Inventors: Lin-Yao Liao, Taichung (TW); Tsung-Han Tsai, Taichung (TW); Ming-Ta Chou, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 24 days.

This patent is subject to a terminal disclaimer.

(21) Appl. No.: 14/464,704

(22) Filed: Aug. 20, 2014

(65) Prior Publication Data

US 2014/0355135 A1 Dec. 4, 2014

Related U.S. Application Data

(63) Continuation of application No. 13/662,731, filed on Oct. 29, 2012, now Pat. No. 8,854,744.

(30) Foreign Application Priority Data

Jun. 14, 2012 (TW) .............................. 101121344 A

(51) Int. Cl.
*G02B 13/18* (2006.01)
*G02B 13/00* (2006.01)
*G02B 9/62* (2006.01)

(52) U.S. Cl.
CPC ............. *G02B 13/0045* (2013.01); *G02B 9/62* (2013.01); *G02B 13/002* (2013.01); *G02B 13/18* (2013.01)

(58) Field of Classification Search
CPC .... G02B 13/0045; G02B 9/62; G02B 13/18; G02B 9/64; G02B 13/001; G02B 13/22; G02B 3/02; G02B 1/00
USPC ........................................ 359/713, 756, 759
See application file for complete search history.

(56) References Cited

U.S. PATENT DOCUMENTS

| 7,869,142 B2 | 1/2011 | Chen et al. |
| 8,000,030 B2 | 8/2011 | Tang |
| 8,000,031 B1 | 8/2011 | Tsai |

(Continued)

FOREIGN PATENT DOCUMENTS

| CN | 202067015 U | 12/2011 | |
| KR | 20100040357 A | 4/2010 | |
| TW | 101120253 | * 10/2012 | ............. G02B 13/18 |

*Primary Examiner* — Alicia M Harrington
(74) *Attorney, Agent, or Firm* — CKC & Partners Co., Ltd.

(57) ABSTRACT

An optical image lens system includes, in order from an object side to an image side, a first lens element, a second lens element, a third lens element, a fourth lens element, a fifth lens element and a sixth lens element. The first lens element with positive refractive power has a convex object-side surface and a concave image-side surface. The second lens element, the third lens element, and the fourth lens element have refractive power. The fifth lens element with positive refractive power is made of plastic, and has a convex object-side surface and a concave image-side surface, wherein the surfaces thereof are aspheric. The sixth lens element with refractive power is made of plastic, and has a concave image-side surface, wherein the image-side surface thereof changes from concave at a paraxial region to convex at a peripheral region, and the surfaces thereof are aspheric.

21 Claims, 20 Drawing Sheets

(56) References Cited

U.S. PATENT DOCUMENTS

| | | |
|---|---|---|
| 8,385,006 B2 | 2/2013 | Tsai et al. |
| 8,749,896 B2 | 6/2014 | Shinohara |
| 8,760,774 B2 | 6/2014 | Lai et al. |
| 2009/0219630 A1 | 9/2009 | Yamamoto |
| 2013/0329306 A1* | 12/2013 | Tsai .................. G02B 13/0045 359/713 |

* cited by examiner

OPTICAL IMAGE LENS SYSTEM

RELATED APPLICATIONS

The present application is a continuation of the application Ser. No. 13/662,731, filed Oct. 29, 2012, the entire contents of which are hereby incorporated herein by reference, which claims priority to Taiwan Application Serial Number 101121344, filed Jun. 14, 2012, all of which are herein incorporated by reference.

BACKGROUND

1. Technical Field

The present invention relates to an optical image lens system. More particularly, the present invention relates to a compact optical image lens system applicable to electronic products and three-dimensional (3D) image applications thereof.

2. Description of Related Art

In recent years, with the popularity of mobile products with camera functionalities, the demand for a miniaturized photographing lens assembly is increasing. The sensor of a conventional photographing camera is typically a CCD (Charge-Coupled Device) image sensor or a CMOS (Complementary Metal-Oxide Semiconductor) sensor. As the advanced semiconductor manufacturing technologies have allowed the pixel size of sensors to be reduced and compact photographing lens assemblies have gradually evolved toward the field of higher megapixels, there is an increasing demand for photographing lens assemblies featuring better image quality.

A conventional compact optical lens system employed in a portable electronic product, such as the one disclosed in U.S. Pat. No. 7,869,142, mainly adopts a four-element lens structure. Due to the popularity of mobile products with high-end specifications, such as smart phones and PDAs (Personal Digital Assistants), the requirements for smaller pixel size and better image quality have been increasing. However, the conventional four-element lens structure cannot satisfy these requirements of the compact optical lens system.

Although other conventional optical lens systems with five-element lens structure such as the ones disclosed in U.S. Pat. No. 8,000,030 and U.S. Pat. No. 8,000,031 enhance image quality and resolving power, these optical designs still reside with unsolved problems. Since there are no three continuous lens elements closest to the object side with positive refractive power, it is not favorable for presenting its telephoto functionality in which the telephoto ratio is thereby limited. These optical designs are also hard to keep the lens system compact while achieving for the same telephoto ratio. Besides, these optical designs are not favorable for reducing the sensitivity of the lens system because its positive refractive power of these optical systems is not effectively distributed.

SUMMARY

According to one aspect of the present disclosure, an optical image lens system includes, in order from an object side to an image side, a first lens element, a second lens element, a third lens element, a fourth lens element, a fifth lens element and a sixth lens element. The first lens element with positive refractive power has a convex object-side surface and a concave image-side surface. The second lens element has refractive power. The third lens element has refractive power. The fourth lens element has refractive power. The fifth lens element with positive refractive power is made of plastic, and has a convex object-side surface and a concave image-side surface wherein the object-side surface and the image-side surface of the fifth lens element are aspheric. The sixth lens element with refractive power is made of plastic, and has a concave image-side surface, wherein the image-side surface of the sixth lens element changes from concave at a paraxial region to convex at a peripheral region, and an object-side surface and the image-side surface of the sixth lens element are aspheric. The optical image lens system has a total of six lens elements with refractive power. When a maximal field of view of the optical image lens system is FOV, the following relationship is satisfied: 70 degrees<FOV<100 degrees.

According to another aspect of the present disclosure, an optical image lens system includes, in order from an object side to an image side, a first lens element, a second lens element, a third lens element, a fourth lens element, a fifth lens element and a sixth lens element. The first lens element with positive refractive power has a convex object-side surface. The second lens element has refractive power. The third lens element with refractive power has a convex image-side surface. The fourth lens element has refractive power. The fifth lens element with positive refractive power is made of plastic, and has a convex object-side surface and a concave image-side surface, wherein the object-side surface and the image-side surface of the fifth lens element are aspheric. The sixth lens element with refractive power is made of plastic, and has a concave image-side surface, wherein the image-side surface of the sixth lens element changes from concave at a paraxial region to convex at a peripheral region, and an object-side surface and the image-side surface of the sixth lens element are aspheric. The optical image lens system has a total of six lens elements with refractive power. When a maximal field of view of the optical image lens system is FOV, the following relationship is satisfied: 70 degrees<FOV<100 degrees.

According to another aspect of the present disclosure, an optical image lens system includes, in order from an object side to an image side, a first lens element, a second lens element, a third lens element, a fourth lens element, a fifth lens element and a sixth lens element. The first lens element with positive refractive power has a convex object-side surface. The second lens element with refractive power has a convex object-side surface. The third lens element has refractive power. The fourth lens element has refractive power. The fifth lens element with positive refractive power is made of plastic, and has a convex object-side surface and a concave image-side surface wherein the object-side surface and the image-side surface of the fifth lens element are aspheric. The sixth lens element with refractive power is made of plastic, and has a concave image-side surface, wherein the image-side surface of the sixth lens element changes from concave at a paraxial region to convex at a peripheral region, and an object-side surface and the image-side surface of the sixth lens element are aspheric. The optical image lens system has a total of six lens elements with refractive power. When a maximal field of view of the optical image lens system is FOV, the following relationship is satisfied: 70 degrees<FOV<100 degrees.

According to still another aspect of the present disclosure, an optical image lens system includes, in order from an object side to an image side, a first lens element, a second lens element, a third lens element, a fourth lens element, a fifth lens element and a sixth lens element. The first lens element with positive refractive power has a convex object-side surface. The second lens element has refractive power. The third lens element has refractive power. The fourth lens element has refractive power. The fifth lens element with positive refractive power is made of plastic, and has a convex object-side surface and a concave image-side surface wherein the object-side surface and the image-side surface of the fifth lens element are aspheric. The sixth lens element with refractive power is made of plastic, and has a concave image-side surface, wherein the image-side surface of the sixth lens element changes from concave at a paraxial region to convex at a peripheral region, and an object-side surface and the image-side surface of the sixth lens element are aspheric. The optical image lens system has a total of six lens elements with refractive power, each of the first lens element, the second lens element, the third lens element, the fourth lens element, the fifth lens element and the sixth lens element is a single and non-cemented lens element. When a maximal field of view of the optical image lens system is FOV, the following relationship is satisfied: 70 degrees<FOV<100 degrees.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
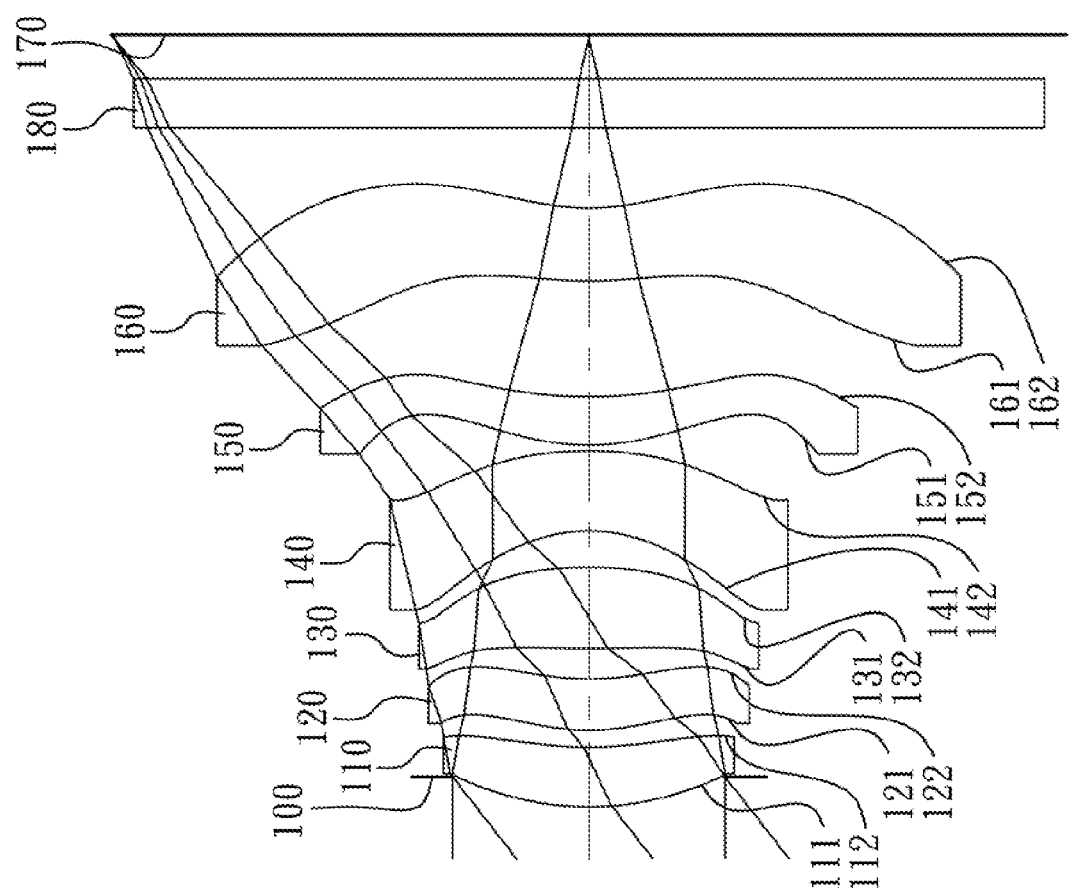
FIG. 1 is a schematic view of an optical image lens system according to the 1st embodiment of the present disclosure.

An optical image lens system includes, in order from an object side to an image side, a first lens element, a second lens element, a third lens element, a fourth lens element, a fifth lens element, and a sixth lens element.

Each of the first lens element, the second lens element, the third lens element, the fourth lens element, the fifth lens element, and the sixth lens element can be a single and non-cemented lens element. That is, any two lens elements adjacent to each other (such as the image-side surface of the first lens element and an object-side surface of the second lens element) are not cemented, and there is an air space between the two lens elements. That is, an air distance between two adjacent surfaces of any two adjacent lens elements. Since the manufacturing process of the cemented lenses is more complex than the non-cemented lenses. In particular, a second surface of one lens and a first surface of the following lens need to have accurate curvature to ensure these two lens elements will be highly cemented. However, during the cementing process, those two lens elements might not be highly cemented due to displacement and it is thereby not favorable for the image quality of the optical image lens system. Therefore, the optical image lens system of the present disclosure can provide six single and non-cemented lens elements for improving upon the problem generated by the cemented lens elements.

The first lens element with positive, refractive power has a convex object-side surface, so that the total track length of the optical image lens system can be reduced by properly adjusting the positive refractive power and the curvature of the object-side surface of the first lens element.

The second lens element with positive refractive power can enhance the telephoto functionality of the optical image lens system by combining with the positive refractive power of the first lens element, so that the total track length thereof can be reduced. The second lens element has an image-side surface being concave at a paraxial region and being convex at a peripheral region, so the astigmatism and the incident angle of the off-axis field onto an image sensor can be effectively reduced and the aberration can be corrected as well.

The third lens element with positive refractive power can enhance the telephoto functionality of the optical image lens system by combining with the positive refractive power of the second lens element, so that the total track length thereof can be reduced. The sensitivity of the optical mage lens system can be reduced by balancing the distribution of the positive refractive power of the first lens element, the second lens element, and the third lens element.

The fourth lens element with negative refractive power has a concave object-side surface and a convex image-side surface. Therefore, the aberration and the astigmatism of the optical image lens system can be corrected.

The fifth lens element with positive refractive power is made of plastic, and can have a convex object-side surface and a concave image-side surface. The object-side surface of the fifth lens element changes from convex at a paraxial region to concave at a peripheral region, and the image-side surface of the fifth lens element changes from concave at a paraxial region to convex at a peripheral region. Therefore, it is favorable for correcting astigmatism to obtain good image quality by employing the significant curvature variations of the object-side and image-side surfaces of the fifth lens element.

The sixth lens element with refractive power is made of plastic and has a concave image-side surface at a paraxial region. The image-side surface of the sixth lens element changes from concave at the paraxial region to convex at a peripheral region. Therefore, a principal point of the optical image lens system can be positioned away from the image plane, and the back focal length of the optical image lens system can be reduced so as to maintain the compact size thereof. Moreover, the incident angle of the off-axis field onto the image sensor can be effectively reduced and the aberration can be further corrected as well to increase the receiving efficiency of the image sensor.

When a curvature radius of the object-side surface of the third lens element is R5, and a curvature radius of the image-side surface of the third lens element is R6, the following relationship is satisfied: $0<(R5+R6)/(R5-R6)<3.2$. Therefore, it is favorable for correcting the spherical aberration and astigmatism of the optical image lens system by properly adjusting the curvature radius of the third lens element.

When a focal length of the optical image lens system is f, and a focal length of the second lens element is f2, the following relationship is satisfied: $0<f/f2<1.0$. Therefore, the positive refractive power of the second lens element can be properly adjusted for enhancing the telephoto functionality of the optical image lens system so as to reduce the total track length thereof.

When the focal length of the second lens element is f2, and a focal length of the third lens element is f3, the following relationship is satisfied: $0<f3/f2<1.6$. Therefore, the positive refractive power of the second and the third lens elements can be properly adjusted for enhancing the telephoto functionality of the optical image lens system so as to reduce the total track length thereof. Furthermore, the sensitivity of the optical image lens system can be reduced by balancing the distribution of the refractive power thereof.

When the focal length of the optical image lens system is f, and a focal length of the fourth lens element is f4, the following relationship is satisfied: $-1.90<f/f4<-0.55$. Therefore, the aberration of the optical image lens system can be corrected by properly adjusting the negative refractive power of the fourth lens element.

When an Abbe number of the fourth lens element is V4, and an Abbe number of the fifth lens element is V5, the following relationship is satisfied: $0.20<V4/V5<0.60$. Therefore, the chromatic aberration of the optical image lens system can be corrected.

When the focal length of the optical image lens system is f, and a curvature radius of the object-side surface of the fifth lens element is R9, the following relationship is satisfied: $0<R9/f<0.8$. Therefore, the astigmatism of the optical image lens system can be corrected.

When the focal length of the optical image lens system is f, a focal length of the first lens element is f1, and the focal length of the second lens element is f2, the following relationships are satisfied: $0<|f/f1|+|f/f2|<1.3$. Therefore, the refractive power of the first lens element and the second lens element are proper, so that the telephoto functionality of the optical image lens system can be enhanced for reducing the total track length thereof.

When a maximal field of view of the optical image lens system is FOV, the following relationship is satisfied: 70 degrees<FOV<100 degrees. Therefore, the proper field of view of the optical image lens system can reduce image distortion so as to improve image quality.

The surfaces of the first lens element through the sixth lens element can be meniscus at a paraxial region thereof. A meniscus lens element indicates that one surface of the lens element is concave at a paraxial region and the other surface of the lens element is convex at a paraxial region. Therefore, the astigmatism of the optical image lens system can be corrected.

When an axial distance between the first lens element and the second lens element is T12, an axial distance between the second lens element and the third lens element is T23, an axial distance between the third lens element and the fourth lens element is T34 an axial distance between the fourth lens element and the fifth lens element is T45, and an axial distance between the fifth lens element and the sixth lens element is T56, and T56 is the largest axial distance among T12, T23, T34, T45, and T56. Therefore, it is favorable for assembling the lens elements to enhance the manufacturing yield rate by properly adjusting the distance between each lens element.

The refractive power of the sixth lens element can be stronger than the refractive power of the first lens element. That is, the absolute value of the refractive power of the sixth lens element can be greater than the absolute value of the refractive power of the first lens element. The refractive power of a lens element can be calculated by the reciprocal of its focal length value.

According to the optical image lens system of the present disclosure, the lens elements thereof can be made of plastic or glass. When the lens elements are made of glass, the allocation of the refractive power of the optical image lens system may be more flexible and easier to design. When the lens elements are made of plastic, the manufacturing cost can be effectively reduced. Furthermore, the surface of each lens element can be aspheric, so that it is easier to make the surface into non-spherical shapes. As a result, more controllable variables are obtained for reducing the aberration, and the number of required lens elements for constructing an optical image lens system can be reduced. Therefore, the total track length of the optical image lens system can also be reduced.

According to the optical image lens system of the present disclosure, each of an object-side surface and an image-side surface of every lens element has a paraxial region and a peripheral region. The paraxial region refers to the region of the surface where light rays travel close to an optical axis and the peripheral region refers to the region of the surface where light rays travel away from the optical axis. Particularly, when a lens element has a convex surface, it indicates that the surface is convex at a paraxial region; and when a lens element has a concave surface, it indicates that the surface is concave at a paraxial region.

According to the optical image lens system of the present disclosure, the optical image lens system can include at least one stop, such as an aperture stop, a glare stop or a field stop.

Said glare stop or said field stop is for eliminating the stray light and thereby improving the image resolution thereof.

In the present optical image lens system, an aperture stop can be configured as a front stop or a middle stop. A front stop disposed between an object and the first lens element can provide a longer distance between an exit pupil of the system and an image plane and which improves the image sensing efficiency of an image sensor. A middle stop disposed between the first lens element and an image plane is favorable for enlarging the field of view of the system and thereby provides a wider field of view for the same.

According to the above description of the present disclosure, the following 1st-10th specific embodiments are provided for further explanation.

1st Embodiment

Figure 2:
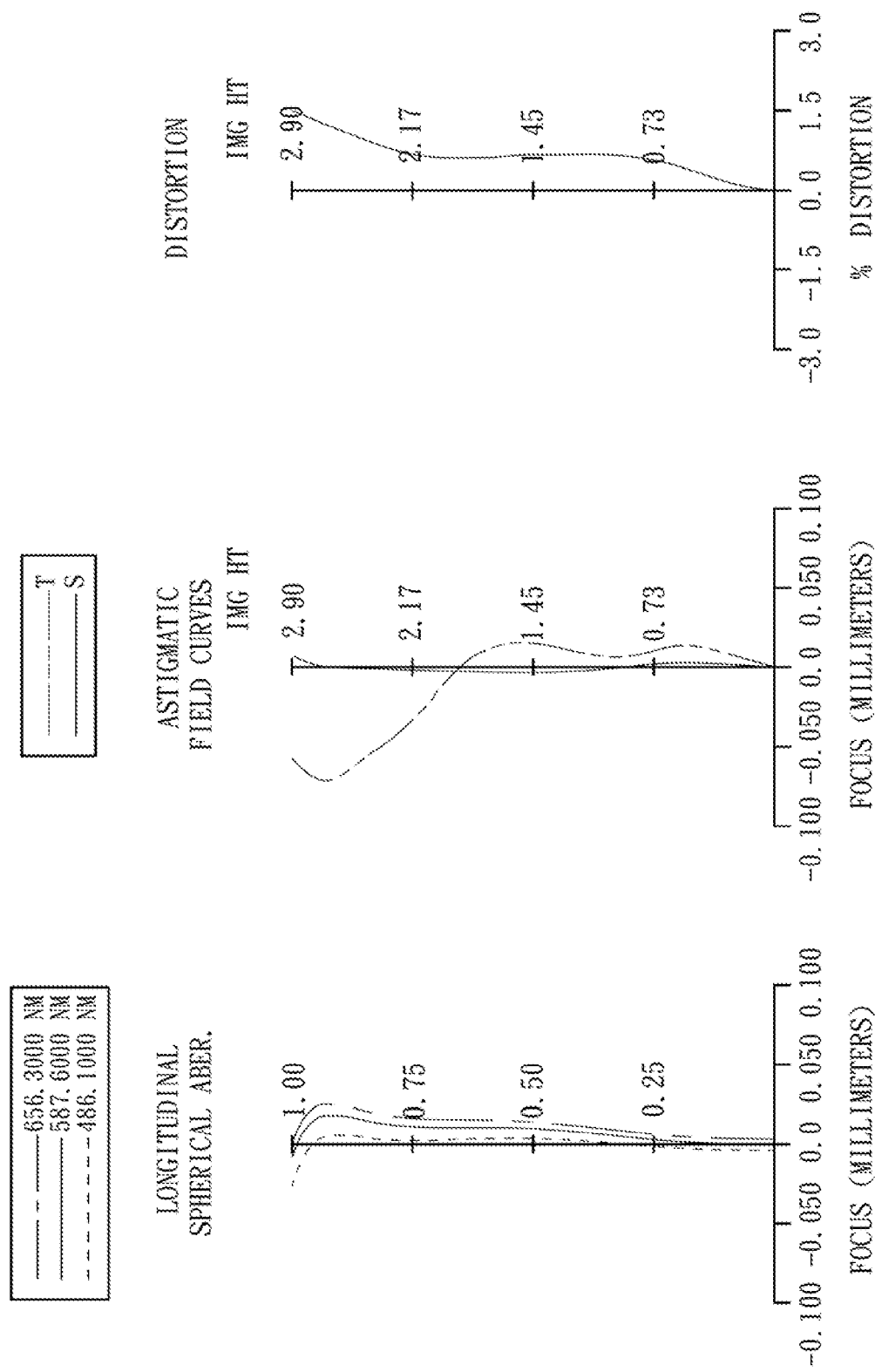
FIG. 2 shows spherical aberration curves, astigmatic field curves and a distortion curve of the optical image lens system according to the 1st embodiment.

FIG. 1 is a schematic view of an optical image lens system according to the 1st embodiment of the present disclosure. FIG. 2 shows spherical aberration curves, astigmatic field curves and a distortion curve of the optical image lens system according to the 1st embodiment. In FIG. 1, the optical image lens system includes, in order from an object side to an image side, an aperture stop 100, a first lens element 110, a second lens element 120, a third lens element 130, a fourth lens element 140, a fifth lens element 150, a sixth lens element 160, an IR-cut filter 180 and an image plane 170.

The first lens element 110 with positive refractive power has a convex object-side surface 111 and a concave image-side surface 112. The first lens element 110 is made of plastic and has the object-side surface 111 and the image-side surface 112 being aspheric.

The second lens element 120 with positive refractive power has a convex object-side surface 121, and an image-side surface 122 being concave at a paraxial region and being convex at a peripheral region. The second lens element 120 is made of plastic and has the object-side surface 121 and the image-side surface 122 being aspheric.

The third lens element 130 with positive refractive power has a convex object-side surface 131 and a convex image-side surface 132. The third lens element 130 is made of plastic and has the object-side surface 131 and the image-side surface 132 being aspheric.

The fourth lens element 140 with negative refractive power has a concave object-side surface 141 and a convex image-side surface 142. The fourth lens element 140 is made of plastic and has the object-side surface 141 and the image-side surface 142 being aspheric.

The fifth lens element 150 with positive refractive power has a convex object-side surface 151 and a concave image-side surface 152, wherein the object-side surface 151 of the fifth lens element 150 changes from convex at a paraxial region to concave at a peripheral region, and the image-side surface 152 of the fifth lens element 150 changes from concave at a paraxial region to convex at a peripheral region. The fifth lens element 150 is made of plastic and has the object-side surface 151 and the age-side surface 152 being aspheric.

The sixth lens element 160 with negative refractive power has a convex object-side surface 161 and a concave image-side surface 162, wherein the image-side surface 162 of the sixth lens element 160 changes from concave at a paraxial region to convex at a peripheral region. The sixth lens element 160 is made of plastic and has the object-side surface 161 and the image-side surface 162 being aspheric.

The IR-cut filter 180 is made of glass, wherein the IR-cut filter 180 is located between the sixth lens element 160 and the image plane 170, and will not affect the focal length of the optical image lens system.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i)$$

where:

X is the relative distance of a point on the aspheric surface spaced at a distance Y from the optical axis relative to the tangential plane at the aspheric surface vertex on the optical axis;

Y is the distance from the point on the curve of the aspheric surface to the optical axis;

R is the curvature radius of the lens elements;

k is the conic coefficient; and

Ai is the i-th aspheric coefficient.

In the optical image lens system according to the 1st embodiment, when a focal length of the optical image lens system is f, an f-number of the optical image lens system is Fno, and half of the maximal field of view of the optical image lens system is HFOV, these parameters have the following values:

f=3.66 mm;
Fno=2.20; and
HFOV=37.9 degrees.

In the optical image lens system according to the 1st embodiment, when an Abbe number of the fourth lens element 140 is V4, and an Abbe number of the fifth lens element 150 is V5, the following relationship is satisfied:

V4/V5=0.41.

In the optical image lens system according to the 1st embodiment, when a curvature radius of the object-side surface 131 of the third lens element 130 is R5, and a curvature radius of the image-side surface 132 of the third lens element 130 is R6, the following relationship is satisfied:

(R5+R6)/(R5−R6)=0.64.

In the optical image lens system according to the 1st embodiment, when a curvature radius of the object-side surface 151 of the fifth lens element 150 is R9, and the focal length of the optical image lens system is f, the following relationship is satisfied:

R9/F=0.36.

In the optical image lens system according to the 1st embodiment, when the focal length of the optical image lens system is f, a focal length of the first lens element 110 is f1, and the focal length of the second lens element 120 is f2, the following relationship is satisfied:

|f/f1|+|f/f2|=0.66.

In the optical image lens system according to the 1st embodiment, when the focal length of the optical image lens system is f, and the focal length of the second lens element 120 is f2, the following relationship is satisfied:

f/f2=0.46.

In the optical image lens system according to the 1st embodiment, when the focal length of the second lens element 120 is f2, and a focal length of the third lens element 130 is f3, the following relationship is satisfied:

$$f3/f2=0.43,$$

In the optical image lens system according to the 1st embodiment, when the focal length of the optical image lens system is f, and a focal length of the fourth lens element 140 is f4, the following relationship is satisfied:

$$f/f4=1.34.$$

In the optical image lens system according to the 1st embodiment, when a maximal field of view of the optical image lens system is FOV, the value of FOV is 75.8 degrees.

The detailed optical data of the 1st embodiment are shown in Table 1 and the aspheric surface data are shown in Table 2 below.

bers 0-16 represent the surfaces sequentially arranged from the object-side to the image-side along the optical axis. In Table 2, k represents the conic coefficient of the equation of the aspheric surface profiles. A1-A16 represent the aspheric coefficients ranging from the 1st order to the 16th order. This information related to Table 1 and Table 2 applies also to the Tables for the remaining embodiments, and so an explanation in this regard will not be provided again.

2nd Embodiment

Figure 3:
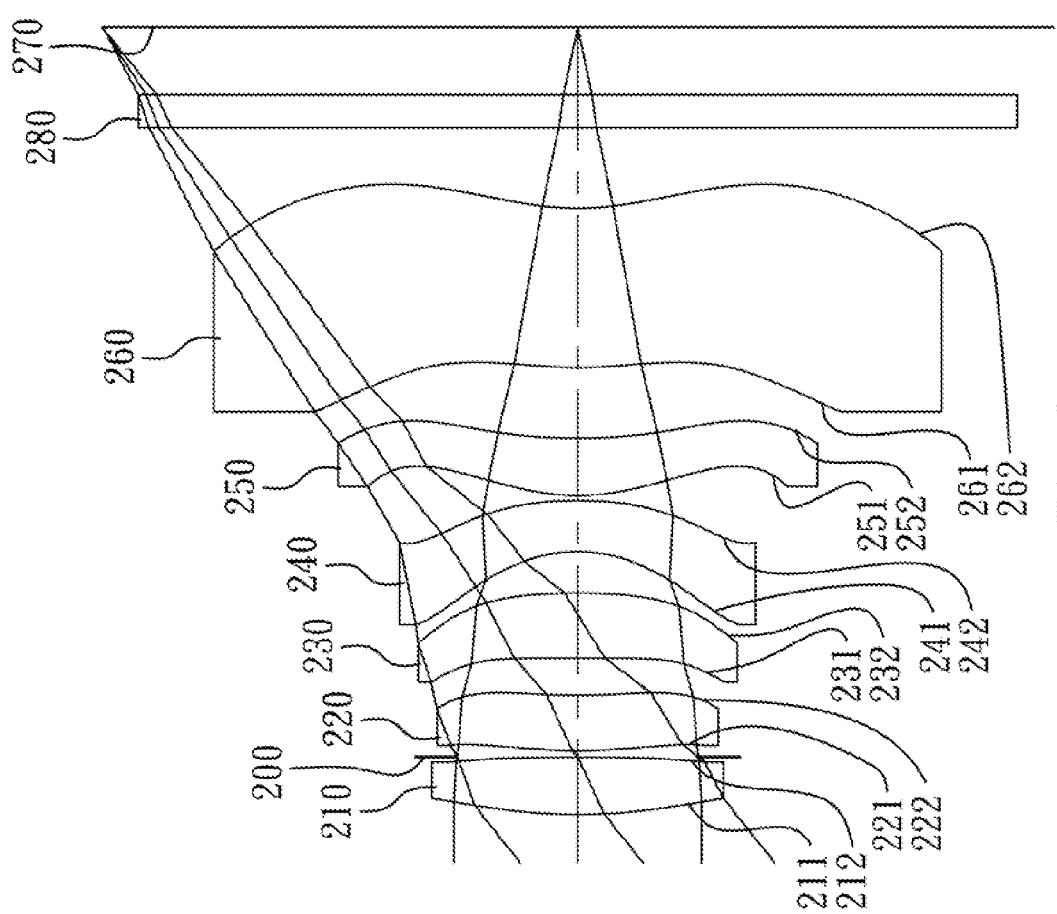
FIG. 3 is a schematic view of an optical image lens system according to the 2nd embodiment of the present disclosure.
Figure 4:
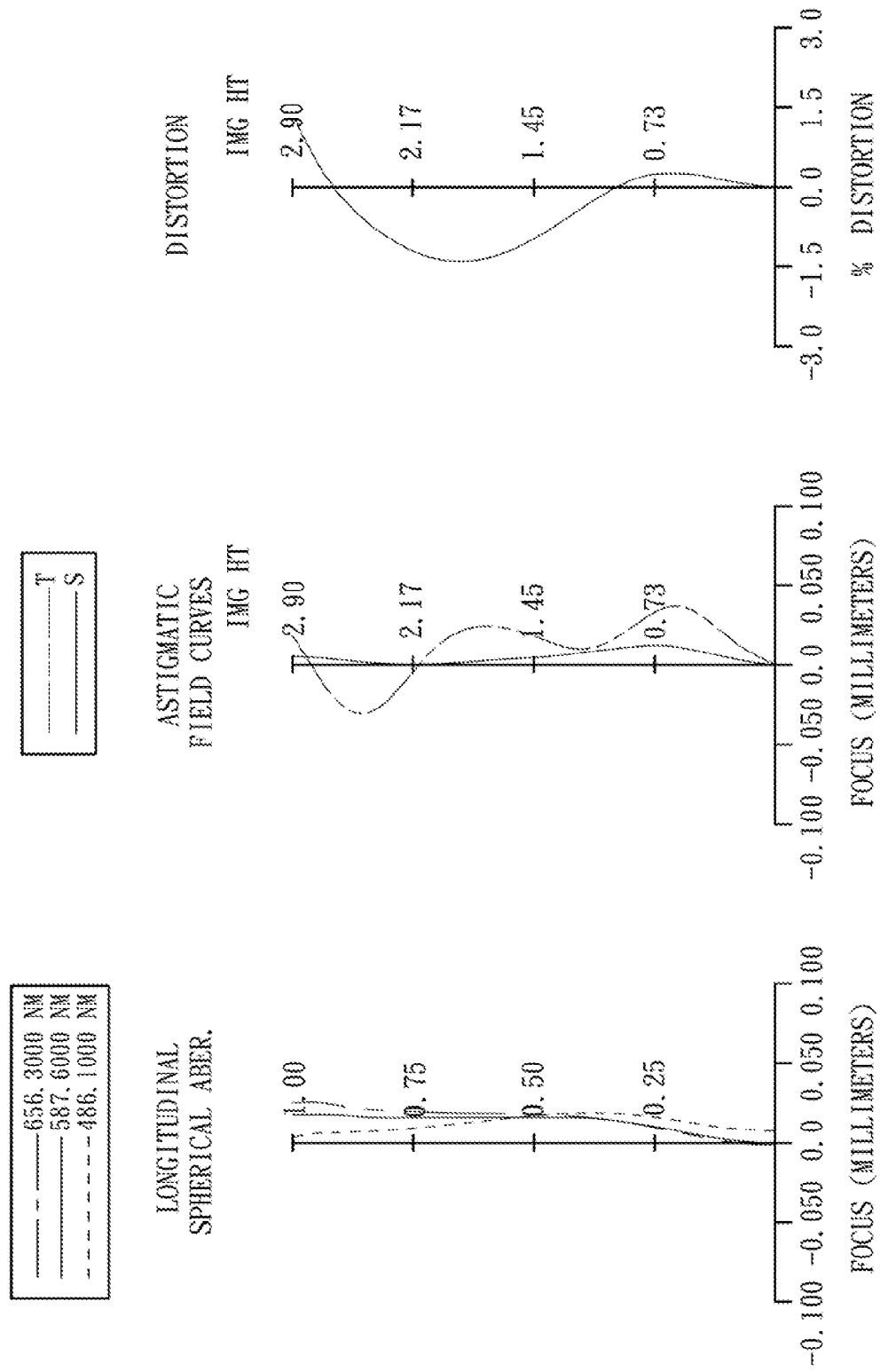
FIG. 4 shows spherical aberration curves, astigmatic field curves and a distortion curve of the optical image lens system according to the 2nd embodiment.

FIG. 3 is a schematic view of an optical image lens system according to the 2nd embodiment of the present, disclosure. FIG. 4 shows spherical aberration curves, astigmatic field curves and a distortion curve of the optical image lens system according to the 2nd embodiment. In FIG. 3, the

TABLE 1

1st Embodiment
f = 3.66 mm, Fno = 2.20, HFOV = 37.9 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.183 | | | | |
| 2 | Lens 1 | 1.806 | (ASP) | 0.364 | Plastic | 1.544 | 55.9 | 18.84 |
| 3 | | 2.036 | (ASP) | 0.100 | | | | |
| 4 | Lens 2 | 1.280 | (ASP) | 0.316 | Plastic | 1.544 | 55.9 | 7.91 |
| 5 | | 1.664 | (ASP) | 0.188 | | | | |
| 6 | Lens 3 | 10.240 | (ASP) | 0.492 | Plastic | 1.544 | 55.9 | 3.44 |
| 7 | | −2.248 | (ASP) | 0.224 | | | | |
| 8 | Lens 4 | −0.919 | (ASP) | 0.485 | Plastic | 1.640 | 23.3 | −2.72 |
| 9 | | −2.345 | (ASP) | 0.035 | | | | |
| 10 | Lens 5 | 1.323 | (ASP) | 0.300 | Plastic | 1.535 | 56.3 | 3.79 |
| 11 | | 3.511 | (ASP) | 0.706 | | | | |
| 12 | Lens 6 | 2.718 | (ASP) | 0.440 | Plastic | 1.535 | 56.3 | −5.97 |
| 13 | | 1.386 | (ASP) | 0.492 | | | | |
| 14 | IR-cut filter | Plano | | 0.300 | Glass | 1.517 | 64.2 | — |
| 15 | | Plano | | 0.267 | | | | |
| 16 | Image | Plano | | — | | | | |

Reference wavelength (d-line) is 587.6 nm

TABLE 2

Aspheric Coefficients

| Surface # | | | | | |
|---|---|---|---|---|---|
| 2 | 3 | 4 | 5 | 6 | 7 |

| | 2 | 3 | 4 | 5 | 6 | 7 |
|---|---|---|---|---|---|---|
| k = | −1.1741E+00 | −1.9136E+01 | −6.3851E+00 | −2.8793E+00 | −1.1741E+01 | −2.0000E+01 |
| A4 = | −1.1914E−02 | −1.8076E−01 | −2.1616E−01 | −1.9319E−01 | −1.0380E−01 | −2.6263E−01 |
| A6 = | 1.0882E−01 | 3.6402E−01 | 5.0209E−02 | −1.8064E−01 | −1.6975E−01 | −7.3150E−02 |
| A8 = | −1.8078E−01 | −5.6911E−01 | −4.1204E−02 | 1.5874E−01 | 8.2887E−02 | 4.7717E−02 |
| A10 = | 1.7895E−01 | 4.7408E−01 | −8.6457E−02 | −5.8000E−02 | −1.9927E−01 | 1.5010E−01 |
| A12 = | −9.8335E−02 | −2.3496E−01 | −4.5442E−02 | −2.5160E−01 | 2.6764E−01 | −1.1984E−01 |
| A14 = | | | | 2.0208E−01 | −5.5201E−02 | 6.4770E−02 |

| Surface # | | | | | |
|---|---|---|---|---|---|
| 8 | 9 | 10 | 11 | 12 | 13 |

| | 8 | 9 | 10 | 11 | 12 | 13 |
|---|---|---|---|---|---|---|
| k = | −4.9652E+00 | 3.8701E−02 | −7.5636E+00 | 1.1041E+00 | −2.0000E+01 | −4.7394E+00 |
| A4 = | −2.7395E−01 | −1.1100E−01 | 7.8826E−02 | 1.7557E−01 | −1.9002E−01 | −1.8222E−01 |
| A6 = | −1.8043E−01 | 2.7731E−02 | −1.9025E−01 | −3.8131E−01 | 3.5324E−02 | 9.7623E−02 |
| A8 = | 6.7082E−02 | 1.6794E−01 | 9.2275E−02 | 3.0878E−01 | 1.8523E−02 | −4.2574E−02 |
| A10 = | −6.5428E−01 | −2.0155E−01 | −3.0406E−02 | −1.7157E−01 | −1.0336E−02 | 1.2934E−02 |
| A12 = | 3.8321E−01 | 1.0609E−01 | −9.2850E−04 | 6.0698E−02 | 2.2036E−03 | −2.4524E−03 |
| A14 = | −9.0945E−02 | −1.8429E−02 | 2.3757E−03 | −1.1501E−02 | −2.3069E−04 | 2.5592E−04 |
| A16 = | | | | 8.6055E−04 | | −1.1161E−05 |

In Table 1, the curvature radius, the thickness and the focal length are shown in millimeters (mm). Surface numbers optical image lens system includes, in order from an object side to an image side, a first lens element 210, an aperture stop 200, a second lens element 220, a third lens element 230, a fourth lens element 240, a fifth lens element 250, a sixth icy lens element 260, an IR-cut filter 280, and an image plane 270.

The first lens element 210 with positive refractive power has a convex object-side surface 211 and a convex image-side surface 212. The first lens element 210 is made of plastic and has the object-side surface 211 and the image-side surface 212 being aspheric.

The second lens element 220 with positive refractive power has a convex object-side surface 221, and an image-side surface 222 being concave at a paraxial region and being convex at a peripheral region. The second lens element 220 is made of plastic and has the object-side surface 221 and the image-side surface 222 being aspheric.

The third lens element 230 with positive refractive power has a convex object-side surface 231 and a convex image-side surface 232. The third lens element 230 is made of plastic and has the object-side surface 231 and the image-side surface 232 being aspheric.

The fourth lens element 240 with negative refractive power has a concave object-side surface 241 and a convex image-side surface 242. The fourth lens element 240 is made of plastic and has the object-side surface 241 and the image-side surface 242 being aspheric.

The fifth lens element 250 with positive refractive power has a convex object-side surface 251 and a concave image-side surface 252, wherein the object-side surface 251 of the fifth lens element 250 changes from convex at a paraxial region to concave at a peripheral region, and the image-side surface 252 of the fifth lens element 250 changes from concave at a paraxial region to convex at a peripheral region. The fifth lens element 250 is made of plastic and has the object-side surface 251 and the image-side surface 252 being aspheric.

The sixth lens element 260 with negative refractive power has a convex object-side surface 261 and a concave image-side surface 262, wherein the image-side surface 262 of the sixth lens element 260 changes from concave at a paraxial region to convex at a peripheral region. The sixth lens element 260 is made of plastic and has the object-side surface 261 and the image-side surface 262 being aspheric.

The IR-cut filter 280 is made of glass, wherein the IR-cut filter 280 is located between the sixth lens element 260 and the image plane 270, and will not affect the focal length of the optical image lens system.

The detailed optical data of the 2nd embodiment are shown in Table 3 and the aspheric surface data are shown in Table 4 below.

TABLE 3

2nd Embodiment
f = 3.63 mm, Fno = 2.40, HFOV = 38.2 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Lens 1 | 3.218 | (ASP) | 0.350 | Plastic | 1.544 | 55.9 | 5.54 |
| 2 | | −45.872 | (ASP) | 0.001 | | | | |
| 3 | Ape. Stop | Plano | | 0.039 | | | | |
| 4 | Lens 2 | 3.094 | (ASP) | 0.338 | Plastic | 1.544 | 55.9 | 25.91 |
| 5 | | 3.811 | (ASP) | 0.224 | | | | |
| 6 | Lens 3 | 40.240 | (ASP) | 0.401 | Plastic | 1.535 | 56.3 | 6.13 |
| 7 | | −3.558 | (ASP) | 0.249 | | | | |
| 8 | Lens 4 | −0.889 | (ASP) | 0.315 | Plastic | 1.640 | 23.3 | −2.32 |
| 9 | | −2.516 | (ASP) | 0.030 | | | | |
| 10 | Lens 5 | 1.241 | (ASP) | 0.350 | Plastic | 1.535 | 56.3 | 3.13 |
| 11 | | 4.340 | (ASP) | 0.433 | | | | |
| 12 | Lens 6 | 2.789 | (ASP) | 0.972 | Plastic | 1.535 | 56.3 | −11.69 |
| 13 | | 1.694 | (ASP) | 0.492 | | | | |
| 14 | IR-cut filter | Plano | | 0.200 | Glass | 1.517 | 64.2 | — |
| 15 | | Plano | | 0.412 | | | | |
| 16 | Image | Plano | | — | | | | |

Reference wavelength (d-line) is 587.6 nm

TABLE 4

Aspheric Coefficients

| | Surface # | | | | | |
|---|---|---|---|---|---|---|
| | 1 | 2 | 4 | 5 | 6 | 7 |
| k = | −2.9048E+00 | 3.0000E+00 | −1.6948E+01 | −9.4924E+00 | −2.0000E+01 | −9.4568E+00 |
| A4 = | −2.7170E−02 | −2.1356E−01 | −2.3502E−01 | −2.4678E−01 | −1.6031E−01 | −1.4791E−01 |
| A6 = | 8.1015E−03 | 6.7931E−01 | 6.7148E−01 | −6.2486E−02 | −1.6835E−01 | −1.8961E−01 |
| A8 = | −5.0604E−02 | −1.3264E+00 | −1.4200E+00 | −1.2540E−02 | −7.5469E−02 | 6.1565E−02 |
| A10 = | 8.1431E−02 | 1.4246E+00 | 1.4345E+00 | −2.3331E−01 | 2.2431E−01 | 1.5856E−01 |
| A12 = | −4.7155E−02 | −6.6174E−01 | −7.6572E−01 | 3.8733E−01 | −1.9756E−01 | −2.0985E−01 |
| A14 = | | | | −1.6718E−01 | 1.9635E−01 | 1.2466E−01 |

| | Surface # | | | | | |
|---|---|---|---|---|---|---|
| | 8 | 9 | 10 | 11 | 12 | 13 |
| k = | −4.5453E+00 | 2.1732E+00 | −9.3751E+00 | 3.0000E+00 | −2.0000E+01 | −2.9719E+00 |
| A4 = | −3.8419E−01 | −3.0509E−01 | 7.8826E−02 | 1.7557E−01 | −1.9002E−01 | −1.8222E−01 |

TABLE 4-continued

| Aspheric Coefficients | | | | | | |
|---|---|---|---|---|---|---|
| A6 = | 4.5647E−02 | 2.9703E−01 | −1.9025E−01 | −3.8131E−01 | 3.5324E−02 | 9.7623E−02 |
| A8 = | 5.6141E−01 | 9.9835E−03 | 9.2275E−02 | 3.0878E−01 | 1.8523E−01 | −4.2574E−02 |
| A10 = | −6.4731E−01 | −9.9276E−02 | −3.0406E−02 | −1.7157E−01 | −1.0336E−02 | 1.2934E−02 |
| A12 = | 4.7526E−01 | 9.3339E−02 | −9.2850E−04 | 6.0698E−02 | 2.2036E−03 | −2.4524E−03 |
| A14 = | −1.6091E−01 | −2.5774E−02 | 2.3757E−03 | −1.1501E−02 | −2.3069E−04 | 2.5592E−04 |
| A16 = | | | | 8.6055E−04 | 9.7129E−06 | −1.1161E−05 |

In the optical image lens system according to the 2nd embodiment, the definitions of f, Fno, HFOV, V4, V5, R5, R6, R9, f1 f2, 13, 14, and FOV are the same as those stated in the 1st embodiment with corresponding values for the 2nd embodiment. Moreover, these parameters can be calculated from Table 3 and Table 4 as the following values and satisfy the following relationships:

| | | | |
|---|---|---|---|
| f (mm) | 3.63 | $|f/f1| + |f/f2|$ | 0.80 |
| Fno | 2.40 | f/f2 | 0.14 |
| HFOV (deg.) | 38.2 | f3/f2 | 0.24 |
| V4/V5 | 0.41 | f/f4 | −1.56 |
| (R5 + R6)/(R5 − R6) | 0.84 | FOV (deg.) | 76.4 |
| R9/f | 0.34 | | |

3rd Embodiment

Figure 5:
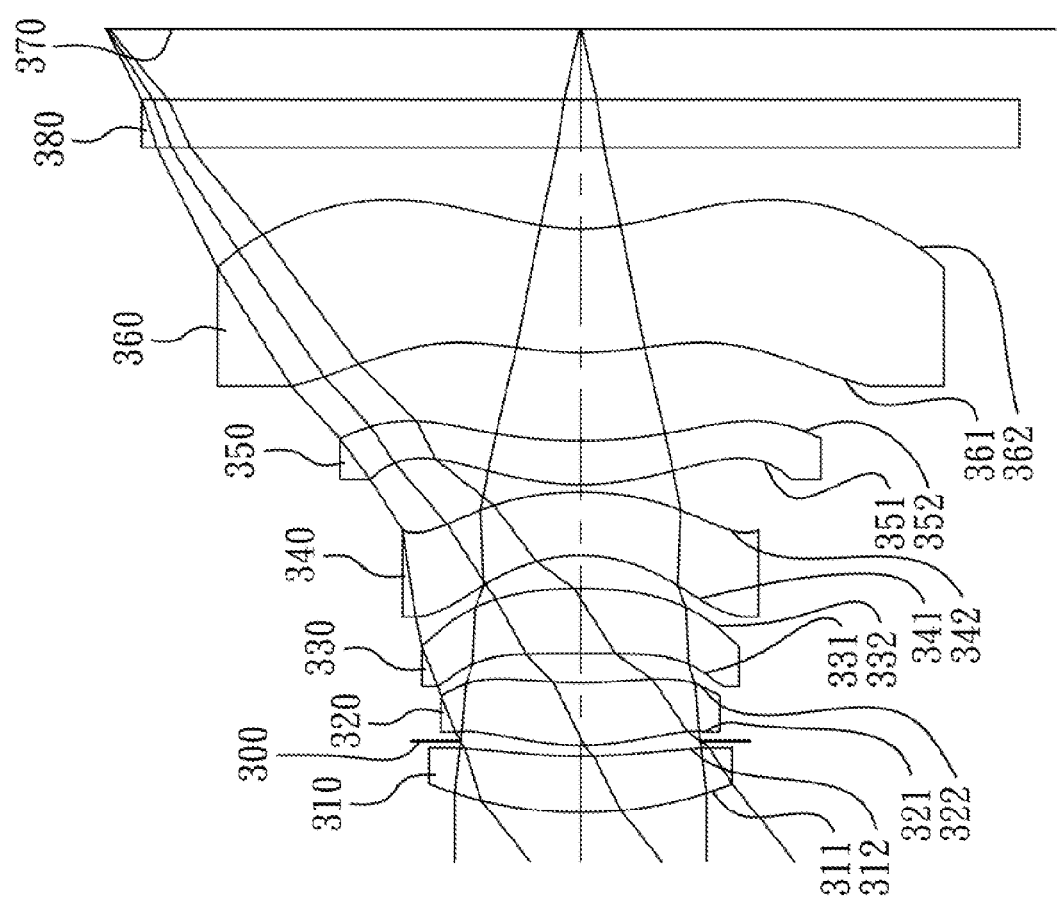
FIG. 5 is a schematic view of an optical image lens system according to the 3rd embodiment of the present disclosure.
Figure 6:
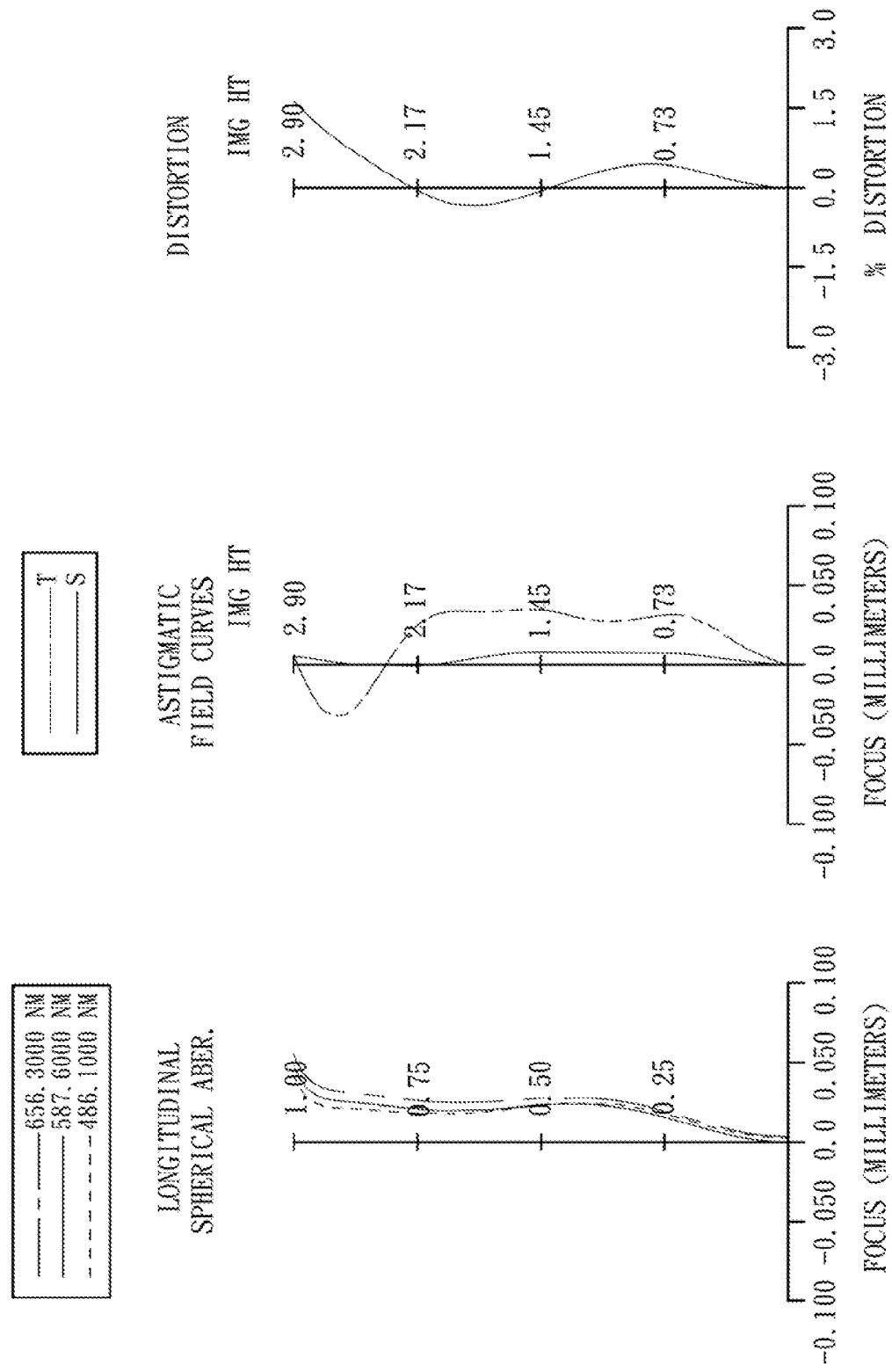
FIG. 6 shows spherical aberration curves, astigmatic field curves and a distortion curve of the optical image lens system according to the 3rd embodiment.

FIG. 5 is a schematic view of an optical image lens system according to the 3rd embodiment of the present disclosure. FIG. 6 shows spherical aberration curves, astigmatic field curves and a distortion curve of the optical image lens system according to the 3rd embodiment. In FIG. 5, the optical image lens system includes, in order from an object side to an image side, a first lens element 310, an aperture stop 300, a second lens element 320, a third lens element 330, a fourth lens element 340, a fifth lens element 350, a sixth lens element 360, an IR-cut filter 380, and an image plane 370.

The first lens element 310 with positive refractive power has a convex object-side surface 311 and a concave image-side surface 312. The first lens element 310 is made of plastic and has the object-side surface 311 and the image-side surface 312 being aspheric.

The second lens element 320 with positive refractive power has a convex object-side surface 321, and an image-side surface 322 being concave at a paraxial region and being convex at a peripheral region. The second lens element 320 is made of plastic and has the object-side surface 321 and the image-side surface 322 being aspheric.

The third lens element 330 with positive refractive power has a concave object-side surface 331 and a convex image-side surface 332. The third lens element 330 is made of plastic and has the object-side surface 331 and the image-side surface 332 being aspheric.

The fourth lens element 340 with negative refractive power has a concave object-side surface 341 and a convex image-side surface 342. The fourth lens element 340 is made of plastic and has the object-side surface 341 and the image-side surface 342 being aspheric.

The fifth lens element 350 with positive refractive power has a convex object-side surface 351 and a concave image-side surface 352, wherein the object-side surface 351 of the fifth lens element 350 changes from convex at a paraxial region to concave at a peripheral region, and the image-side surface 352 of the fifth lens element 350 changes from concave at a paraxial region to convex at a peripheral region. The fifth lens element 350 is made of plastic and has the object-side surface 351 and the image-side surface 352 being aspheric.

The sixth lens element 360 with negative refractive power has a convex object-side surface 361 and a concave image-side surface 362, wherein the image-side surface 362 of the sixth lens element 360 changes from concave at a paraxial region to convex at a peripheral region. The sixth lens element 360 is made of plastic and has the object-side surface 361 and the image-side surface 362 being aspheric.

The IR-cut filter 380 is made of glass, wherein the IR-cut filter 380 is located between the sixth lens element 360 and the image plane 370, and will not affect the focal length of the optical image lens system.

The detailed optical data of the 3rd embodiment are shown in Table 5 and the aspheric surface data are shown in Table 6 below.

TABLE 5

3rd Embodiment
f = 3.55 mm, Fno = 2.30, HFOV = 38.7 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Lens 1 | 2.574 | (ASP) | 0.346 | Plastic | 1.535 | 56.3 | 38.26 |
| 2 | | 2.806 | (ASP) | 0.092 | | | | |
| 3 | Ape. Stop | Plano | | −0.025 | | | | |
| 4 | Lens 2 | 1.524 | (ASP) | 0.385 | Plastic | 1.535 | 56.3 | 5.09 |
| 5 | | 3.157 | (ASP) | 0.175 | | | | |
| 6 | Lens 3 | −47.338 | (ASP) | 0.401 | Plastic | 1.535 | 56.3 | 5.34 |
| 7 | | −2.701 | (ASP) | 0.203 | | | | |
| 8 | Lens 4 | −0.995 | (ASP) | 0.384 | Plastic | 1.650 | 21.4 | −3.40 |
| 9 | | −2.084 | (ASP) | 0.050 | | | | |
| 10 | Lens 5 | 1.675 | (ASP) | 0.271 | Plastic | 1.544 | 55.9 | 5.16 |
| 11 | | 3.917 | (ASP) | 0.539 | | | | |
| 12 | Lens 6 | 2.072 | (ASP) | 0.759 | Plastic | 1.544 | 55.9 | −14.00 |

TABLE 5-continued

3rd Embodiment
f = 3.55 mm, Fno = 2.30, HFOV = 38.7 deg.

| Surface # | | Curvature Radius | Thickness | Material | Index | Abbe # | Focal length |
|---|---|---|---|---|---|---|---|
| 13 | | 1.419 (ASP) | 0.492 | | | | |
| 14 | IR-cut filter | Plano | 0.300 | Glass | 1.517 | 64.2 | — |
| 15 | | Plano | 0.431 | | | | |
| 16 | Image | Plano | — | | | | |

Reference wavelength (d-line) is 587.6 nm

TABLE 6

Aspheric Coefficients

| | Surface # | | | | | |
|---|---|---|---|---|---|---|
| | 1 | 2 | 4 | 5 | 6 | 7 |
| k = | 4.0516E+00 | −2.0000E+01 | −6.9413E+00 | −2.4089E+00 | 3.0000E+00 | 1.6846E+00 |
| A4 = | −4.5780E−02 | −2.7783E−01 | −2.5500E−01 | −2.3385E−01 | −1.9707E−01 | −1.9899E−01 |
| A6 = | 6.2555E−02 | 8.2816E−01 | 6.0931E−01 | −1.9765E−01 | −1.4305E−01 | −7.1543E−02 |
| A8 = | −1.1436E−01 | −1.4711E+00 | −1.4350E+00 | −2.7970E−02 | −2.6778E−01 | 8.0587E−02 |
| A10 = | 8.4659E−02 | 1.3255E+00 | 1.3215E+00 | −2.0127E−01 | 5.3741E−03 | 1.1210E−01 |
| A12 = | −4.4091E−02 | −5.0718E−01 | −6.0009E−01 | 5.0831E−02 | −2.2991E−02 | −2.6180E−01 |
| A14 = | | | | 4.4139E−01 | 5.4529E−01 | 1.6534E−01 |

| | Surface # | | | | | |
|---|---|---|---|---|---|---|
| | 8 | 9 | 10 | 11 | 12 | 13 |
| k = | −2.2294E+00 | 2.1292E+00 | −7.8245E+00 | 3.0000E+00 | −9.1879E+00 | −3.3478E+00 |
| A4 = | −2.5792E−01 | −2.0725E−01 | 7.8826E−02 | 1.7557E−01 | −1.9002E−01 | −1.8222E−01 |
| A6 = | 9.9928E−02 | 3.0706E−01 | −1.9025E−01 | −3.8131E−01 | 3.5324E−02 | 9.7623E−02 |
| A8 = | 5.4760E−01 | −2.1587E−02 | 9.2275E−02 | 3.0878E−01 | 1.8523E−02 | −4.2574E−02 |
| A10 = | −6.7341E−01 | −9.5863E−02 | −3.0406E−02 | −1.7157E−01 | −1.0336E−02 | 1.2934E−02 |
| A12 = | 4.6885E−01 | 1.1108E−01 | −9.2850E−04 | 6.0698E−02 | 2.2036E−03 | −2.4524E−03 |
| A14 = | −1.6181E−01 | −2.4769E−02 | 2.3757E−03 | −1.1501E−02 | −2.3069E−04 | 2.5592E−04 |
| A16 = | | | | 8.6055E−04 | 9.7129E−06 | −1.1161E−05 |

In the optical mage lens system according to the 3rd embodiment, the definitions of f, Fno, HFOV, V4, V5, R5, R6, R9, f1, f2, f3, f4, and FOV are the same as those stated in the 1st embodiment with corresponding values for the 3rd embodiment. Moreover, these parameters can be calculated from Table 5 and Table 6 as the following values and satisfy the following relationships:

| f (mm) | 3.55 | |f/f1| + |f/f2| | 0.79 |
|---|---|---|---|
| Fno | 2.30 | f/f2 | 0.70 |
| HFOV (deg.) | 38.7 | f3/f2 | 1.05 |
| V4/V5 | 0.38 | f/f4 | −1.04 |
| (R5 + R6)/(R5 − R6) | 1.12 | FOV (deg.) | 77.4 |
| R9/f | 0.47 | | |

4th Embodiment

Figure 7:
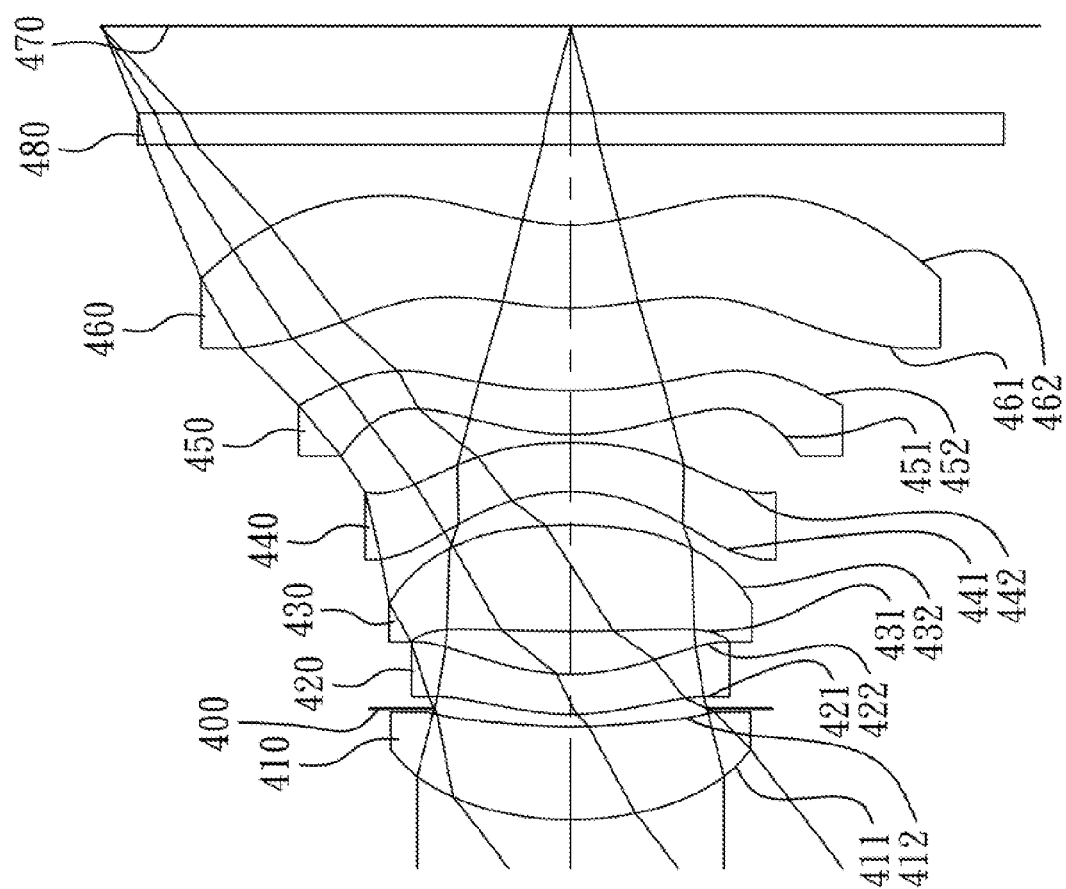
FIG. 7 is a schematic view of an optical image lens system according to the 4th embodiment of the present disclosure.
Figure 8:
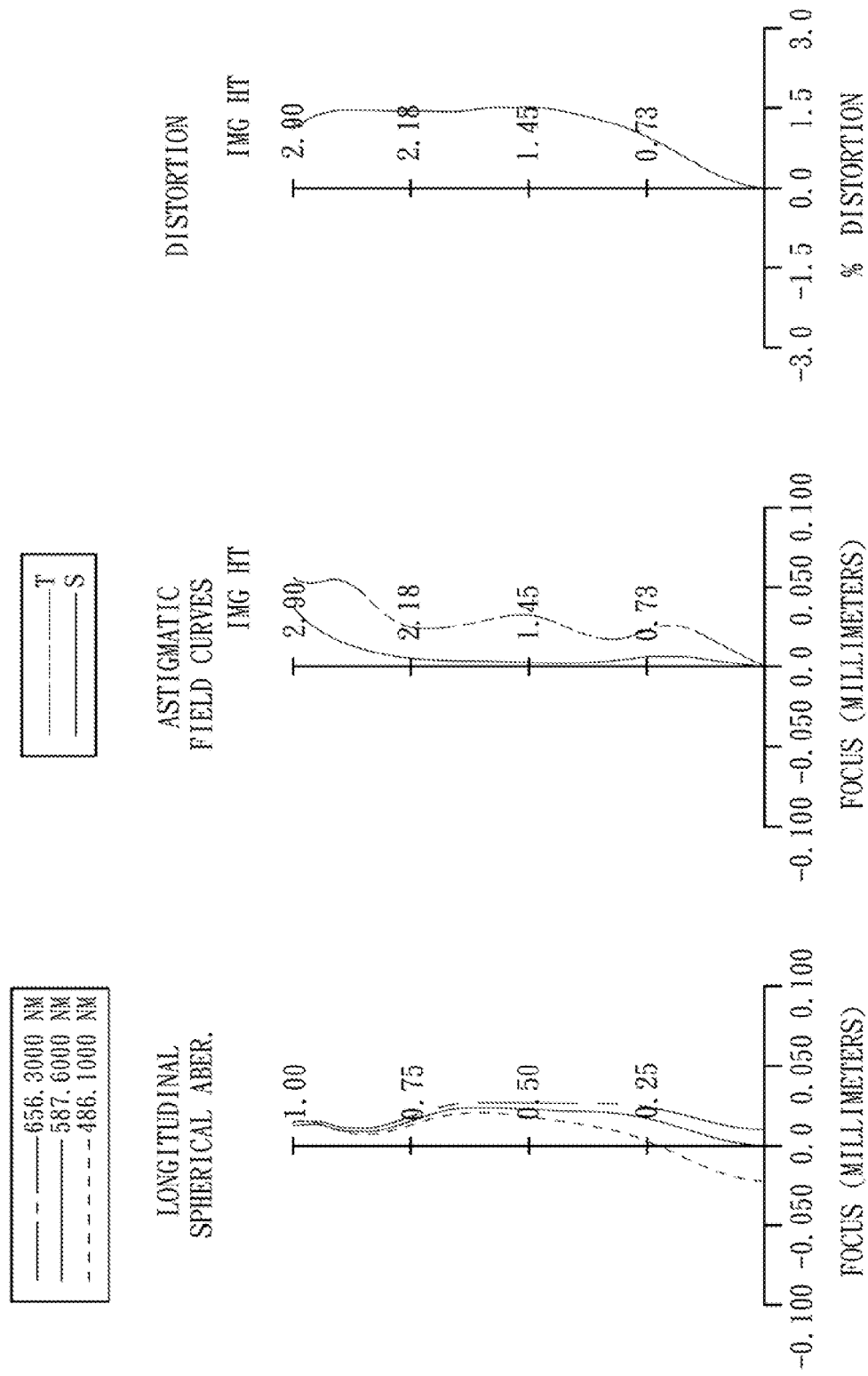
FIG. 8 shows spherical aberration curves, astigmatic field curves and a distortion curve of the optical image lens system according to the 4th embodiment.

FIG. 7 is a schematic view of an optical image lens system according to the 4th embodiment of the present disclosure. FIG. 8 shows spherical aberration curves, astigmatic field curves and a distortion curve of the optical image lens system according to the 4th embodiment. In FIG. 7, the optical image lens system includes, in order from an object side to an image side, a first lens element 410, an aperture stop 400, a second lens element 420, a third lens element 430, a fourth lens element 440, a fifth lens element 450, a sixth lens element 460, an IR-cut filter 480, and an image plane 470.

The first lens element 410 with positive refractive power has a convex object-side surface 411 and a concave image-side surface 412. The first lens element 410 is made of plastic and has the object-side surface 411 and the image-side surface 412 being aspheric.

The second lens element 420 with positive refractive power has a convex object-side surface 421, and an image-side surface 422 being concave at a paraxial region and being convex at a peripheral region. The second lens element 420 is made of plastic and has the object-side surface 421 and the image-side surface 422 being aspheric.

The third lens element 430 with positive refractive power has a convex object-side surface 431 and a convex image-side surface 432. The third lens element 430 is made of plastic and has the object-side surface 431 and the image-side surface 432 being aspheric.

The fourth lens element 440 with negative refractive power has a concave object-side surface 441 and a convex image-side surface 442. The fourth lens element 440 is made of plastic and has the object-side surface 441 and the image-side surface 442 being aspheric.

The fifth lens element 450 with positive refractive power has a convex object-side surface 451 and a concave image-side surface 452, wherein the object-side surface 451 of the fifth lens element 450 changes from convex at a paraxial region to concave at a peripheral region, and the image-side surface 452 of the fifth lens element 450 changes from concave at a paraxial region to convex at a peripheral region.

The fifth lens element 450 is made of plastic and has the object-side surface 451 and the image-side surface 452 being aspheric.

The sixth lens element 460 with negative refractive power has a convex object-side surface 461 and a concave image-side surface 462, wherein the image-side surface 462 of the sixth lens element 460 changes from concave at a paraxial region to convex at a peripheral region. The sixth lens element 460 is made of plastic and has the object-side surface 461 and the image-side surface 462 being aspheric.

The IR-cut filter 480 is made of glass, wherein the IR-cut filter 480 is located between the sixth lens element 460 and the image plane 470, and will not affect the focal length of the optical image lens system.

The detailed optical data of the 4th embodiment are shown in Table 7 and the aspheric surface data are shown in Table 8 below.

In the optical image lens system according to the 4th embodiment, the definitions of f, Fno, HFOV, V4, V5, R5, R6, R9, f1, f2, f3, f4, and FOV are the same as those stated in the 1st embodiment with corresponding values for the 4th embodiment. Moreover, these parameters can be calculated from. Table 7 and Table 8 as the following values and satisfy the following relationships:

| f (mm) | 3.69 | |f/f1| + |f/f2| | 0.43 |
|---|---|---|---|
| Fno | 1.95 | f/f2 | 0.03 |
| HFOV (deg.) | 37.8 | f3/f2 | 0.04 |
| V4/V5 | 0.42 | f/f4 | −0.92 |
| (R5 + R6)/(R5 − R6) | 0.55 | FOV (deg.) | 75.6 |
| R9/f | 0.42 | | |

TABLE 7

4th Embodiment
f = 3.69 mm, Fno = 1.95, HFOV = 37.8 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Lens 1 | 1.996 | (ASP) | 0.579 | Plastic | 1.544 | 55.9 | 9.24 |
| 2 | | 2.971 | (ASP) | 0.111 | | | | |
| 3 | Ape. Stop | Plano | | −0.037 | | | | |
| 4 | Lens 2 | 1.352 | (ASP) | 0.249 | Plastic | 1.640 | 23.3 | 109.36 |
| 5 | | 1.279 | (ASP) | 0.261 | | | | |
| 6 | Lens 3 | 9.769 | (ASP) | 0.656 | Plastic | 1.544 | 55.9 | 4.13 |
| 7 | | −2.852 | (ASP) | 0.207 | | | | |
| 8 | Lens 4 | −1.182 | (ASP) | 0.306 | Plastic | 1.640 | 23.3 | −4.02 |
| 9 | | −2.409 | (ASP) | 0.050 | | | | |
| 10 | Lens 5 | 1.560 | (ASP) | 0.270 | Plastic | 1.544 | 55.9 | 4.58 |
| 11 | | 3.915 | (ASP) | 0.512 | | | | |
| 12 | Lens 6 | 1.817 | (ASP) | 0.512 | Plastic | 1.544 | 55.9 | −11.35 |
| 13 | | 1.265 | (ASP) | 0.492 | | | | |
| 14 | IR-cut filter | Plano | | 0.200 | Glass | 1.517 | 64.2 | — |
| 15 | | Plano | | 0.536 | | | | |
| 16 | Image | Plano | | — | | | | |

Reference wavelength (d-line) is 587.6 nm

TABLE 8

Aspheric Coefficients

| | Surface # | | | | | |
|---|---|---|---|---|---|---|
| | 1 | 2 | 4 | 5 | 6 | 7 |
| k = | −9.6200E−01 | 2.9999E+00 | −1.2543E+00 | −2.6495E+00 | 1.4592E+00 | −4.6322E−01 |
| A4 = | 2.7827E−02 | −4.9274E−01 | −6.5988E−01 | −2.1027E−01 | −5.2362E−02 | −1.2090E−01 |
| A6 = | 1.0935E−02 | 1.3943E+00 | 1.3369E+00 | 2.5087E−01 | 5.7876E−02 | −7.0862E−02 |
| A8 = | 5.1713E−02 | −2.2434E+00 | −2.0135E+00 | −8.0490E−03 | −2.2714E−01 | 1.4569E−01 |
| A10 = | −6.4009E−02 | 2.0051E+00 | 1.7146E+00 | −4.8545E−01 | 4.3802E−01 | −1.2946E−01 |
| A12 = | 3.6610E−02 | −7.4979E−01 | −6.8999E−01 | 5.2367E−01 | −5.2928E−01 | 1.7731E−02 |
| A14 = | | | | −2.0727E−01 | 1.8048E−01 | 9.3180E−03 |

| | Surface # | | | | | |
|---|---|---|---|---|---|---|
| | 8 | 9 | 10 | 11 | 12 | 13 |
| k = | −4.2575E+00 | 4.2341E−01 | −9.9990E+00 | 2.9639E+00 | −1.0000E+01 | −4.0484E+00 |
| A4 = | −2.1893E−01 | −2.8205E−01 | 7.8826E−02 | 1.7557E−01 | −1.9002E−01 | −1.8222E−01 |
| A6 = | −2.0145E−02 | 3.7633E−01 | −1.9025E−01 | −3.8131E−01 | 3.5324E−02 | 9.7623E−02 |
| A8 = | 5.7779E−01 | −2.2549E−01 | 9.2275E−02 | 3.0878E−01 | 1.8523E−01 | −4.2574E−02 |
| A10 = | −7.6911E−01 | 1.0427E−01 | −3.0406E−02 | −1.7157E−01 | −1.0336E−02 | 1.2934E−02 |
| A12 = | 4.8783E−01 | −2.5272E−02 | −9.2850E−04 | 6.0698E−02 | 2.2036E−03 | −2.4524E−03 |
| A14 = | −1.2392E−01 | 2.0197E−03 | 2.3757E−03 | −1.1501E−02 | −2.3069E−04 | 2.5592E−04 |
| A16 = | | | | 8.6055E−04 | 9.7129E−06 | −1.1161E−05 |

5th Embodiment

Figure 9:
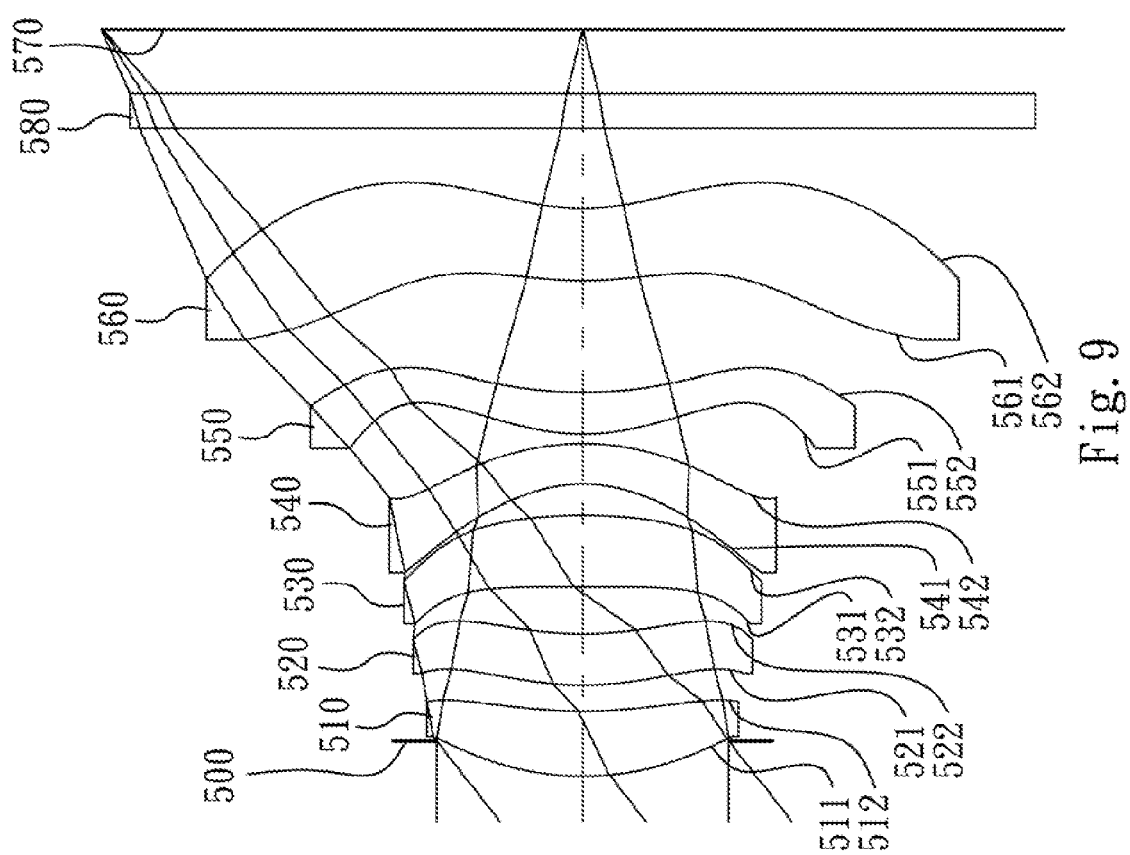
FIG. 9 is a schematic view of an optical image lens system according to the 5th embodiment of the present disclosure.
Figure 10:
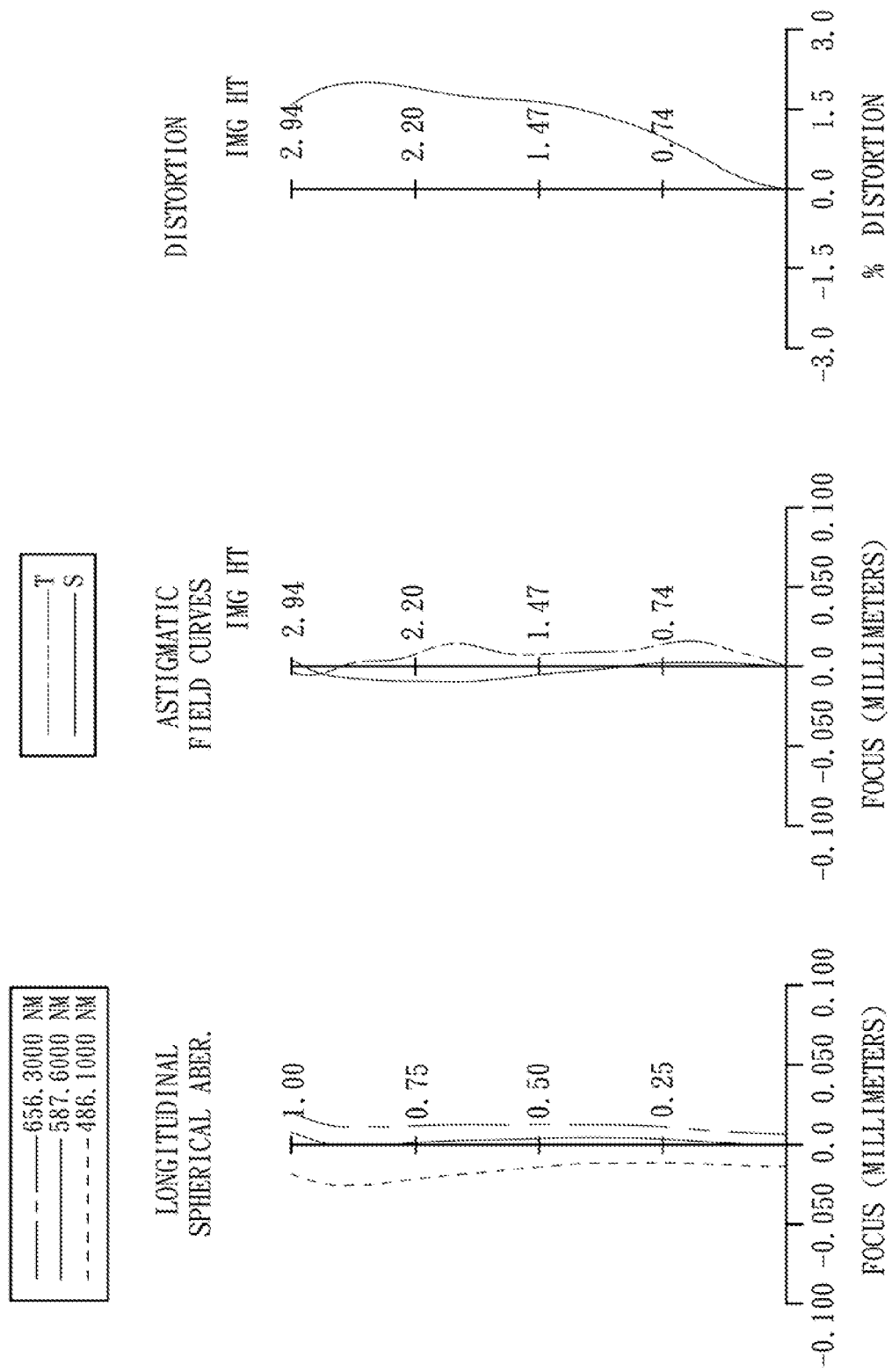
FIG. 10 shows spherical aberration curves, astigmatic field curves and a distortion curve of the optical image lens system according to the 5th embodiment.

FIG. 9 is a schematic view of an optical image lens system according to the 5th embodiment of the present disclosure. FIG. 10 shows spherical aberration curves, astigmatic field curves and a distortion curve of the optical image lens system according to the 5th embodiment. In FIG. 9, the optical image lens system includes, in order from an object side to an image side, an aperture stop 500, a first lens element 510, a second lens element 520, a third lens element 530, a fourth lens element 540, a fifth lens element 550, a sixth iso lens element 560, an IR-cut filter 580, and an image plane 570.

The first lens element 510 with positive refractive power has a convex object-side surface 511 and a concave image-side surface 512. The first lens element 510 is made of plastic and has the object-side surface 511 and the image-side surface 512 being aspheric.

The second lens element 520 with positive refractive power has a convex object-side surface 521, and an image-side surface 522 being concave at a paraxial region and being convex at a peripheral region. The second lens element 520 is made of plastic and has the object-side surface 521 and the image-side surface 522 being aspheric.

The third lens element 530 with positive refractive power has a concave object-side surface 531 and a convex image-side surface 532. The third lens element 530 is made of plastic and has the object-side surface 531 and the image-side surface 532 being aspheric.

The fourth lens element 540 with negative refractive power has a concave object-side surface 541 and a convex image-side surface 542. The fourth lens element 540 is made of plastic and has the object-side surface 541 and the image-side surface 542 being aspheric.

The fifth lens element 550 with positive refractive power has a convex object-side surface 551 and a concave image-side surface 552, wherein the object-side surface 551 of the fifth lens element 550 changes from convex at a paraxial region to concave at a peripheral region, and the image-side surface 552 of the fifth lens element 550 changes from concave at a paraxial region to convex at a peripheral region. The fifth lens element 550 is made of plastic and has the object-side surface 551 and the image-side surface 552 being aspheric.

The sixth lens element 560 with negative refractive power has a convex object-side surface 561 and a concave image-side surface 562, wherein the image-side surface 562 of the sixth lens element 560 changes from concave at a paraxial region to convex at a peripheral region. The sixth lens element 560 is made of plastic and has the object-side surface 561 and the image-side surface 562 being aspheric.

The IR-cut filter 580 is made of glass, wherein the IR-cut filter 580 is located between the sixth lens element 560 and the image plane 570, and will not affect the focal length of the optical image lens system.

The detailed optical data of the 5th embodiment are shown in Table 9 and the aspheric surface data are shown in Table 10 below.

TABLE 9

5th Embodiment
f = 3.72 mm, Fno = 2.08, HFOV = 37.9 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.216 | | | | |
| 2 | Lens 1 | 1.713 | (ASP) | 0.399 | Plastic | 1.544 | 55.9 | 6.92 |
| 3 | | 2.883 | (ASP) | 0.159 | | | | |
| 4 | Lens 2 | 1.873 | (ASP) | 0.315 | Plastic | 1.544 | 55.9 | 16.48 |
| 5 | | 2.228 | (ASP) | 0.285 | | | | |
| 6 | Lens 3 | −650.737 | (ASP) | 0.442 | Plastic | 1.544 | 55.9 | 5.84 |
| 7 | | −3.164 | (ASP) | 0.189 | | | | |
| 8 | Lens 4 | −0.884 | (ASP) | 0.250 | Plastic | 1.640 | 23.3 | −3.47 |
| 9 | | −1.632 | (ASP) | 0.060 | | | | |
| 10 | Lens 5 | 1.324 | (ASP) | 0.257 | Plastic | 1.544 | 55.9 | 3.99 |
| 11 | | 3.163 | (ASP) | 0.684 | | | | |
| 12 | Lens 6 | 2.218 | (ASP) | 0.441 | Plastic | 1.544 | 55.9 | −7.19 |
| 13 | | 1.316 | (ASP) | 0.492 | | | | |
| 14 | IR-cut filter | Plano | | 0.210 | Glass | 1.517 | 64.2 | — |
| 15 | | Plano | | 0.396 | | | | |
| 16 | Image | Plano | | — | | | | |

Reference wavelength (d-line) is 587.6 nm

TABLE 10

Aspheric coefficients

| | Surface # | | | | | |
|---|---|---|---|---|---|---|
| | 2 | 3 | 4 | 5 | 6 | 7 |
| k = | −8.0127E−01 | −1.8942E+01 | −3.7087E+00 | −3.6240E+00 | −5.0000E+01 | −1.5819E+01 |
| A4 = | 1.6215E−04 | −3.5149E−02 | −1.2811E−01 | −8.3352E−02 | −7.7997E−02 | −1.1050E−01 |
| A6 = | 2.4657E−02 | −1.7290E−02 | −6.2030E−04 | −1.0709E−01 | −1.2557E−01 | −6.8630E−02 |
| A8 = | −5.9368E−02 | 2.4805E−02 | −9.2327E−03 | 6.9476E−02 | 5.5161E−02 | −8.5440E−02 |
| A10 = | 6.8896E−02 | −6.0852E−02 | −2.1840E−03 | −7.5520E−02 | −8.4086E−02 | 1.0959E−01 |
| A12 = | −5.1579E−02 | 1.0929E−02 | −2.3253E−02 | −2.9837E−02 | −1.2756E−02 | −4.4328E−02 |
| A14 = | | | | 2.8753E−02 | 4.7667E−02 | 1.5147E−02 |

TABLE 10-continued

Aspheric coefficients

| | Surface # | | | | | |
|---|---|---|---|---|---|---|
| | 8 | 9 | 10 | 11 | 12 | 13 |
| k = | −3.6100E+00 | −1.0349E+00 | −7.4356E+00 | −2.1293E−01 | −1.6318E+01 | −4.6552E+00 |
| A4 = | −3.9188E−02 | −4.5563E−02 | 7.8825E−02 | 1.7556E−01 | −1.9002E−01 | −1.8221E−01 |
| A6 = | −3.6457E−01 | −7.7785E−02 | −1.9025E−01 | −3.8131E−01 | 3.5324E−02 | 9.7623E−02 |
| A8 = | 6.8104E−01 | 2.8647E−01 | 9.2275E−02 | 3.0878E−01 | 1.8523E−02 | −4.2574E−02 |
| A10 = | −6.2465E−01 | −2.5086E−01 | −3.0406E−02 | −1.7157E−01 | −1.0336E−02 | 1.2934E−02 |
| A12 = | 3.0367E−01 | 9.6740E−02 | −9.2850E−04 | 6.0698E−02 | 2.2036E−03 | −2.4524E−03 |
| A14 = | −5.6361E−02 | −7.9207E−03 | 2.3757E−03 | −1.1501E−02 | −2.3069E−04 | 2.5592E−04 |
| A16 = | | | | 8.6055E−04 | 9.7129E−06 | −1.1161E−05 |

In the optical image lens system according to the 5th embodiment, the definitions of f, Fno, HFOV, V4, V5, R5, R6, R9, f1, f2, f3, f4, and FOV are the same as those stated in the 1st embodiment with corresponding values for the 5th embodiment. Moreover, these parameters can be calculated from Table 9 and Table 10 as the following values and satisfy the following relationships:

| f (mm) | 3.72 | $|f/f1| + |f/f2|$ | 0.76 |
|---|---|---|---|
| Fno | 2.08 | f/f2 | 0.23 |
| HFOV (deg.) | 37.9 | f3/f2 | 0.35 |
| V4/V5 | 0.42 | f/f4 | −1.07 |
| (R5 + R6)/(R5 − R6) | 1.01 | FOV (deg.) | 75.8 |
| R9/f | 0.36 | | |

6th Embodiment

Figure 11:
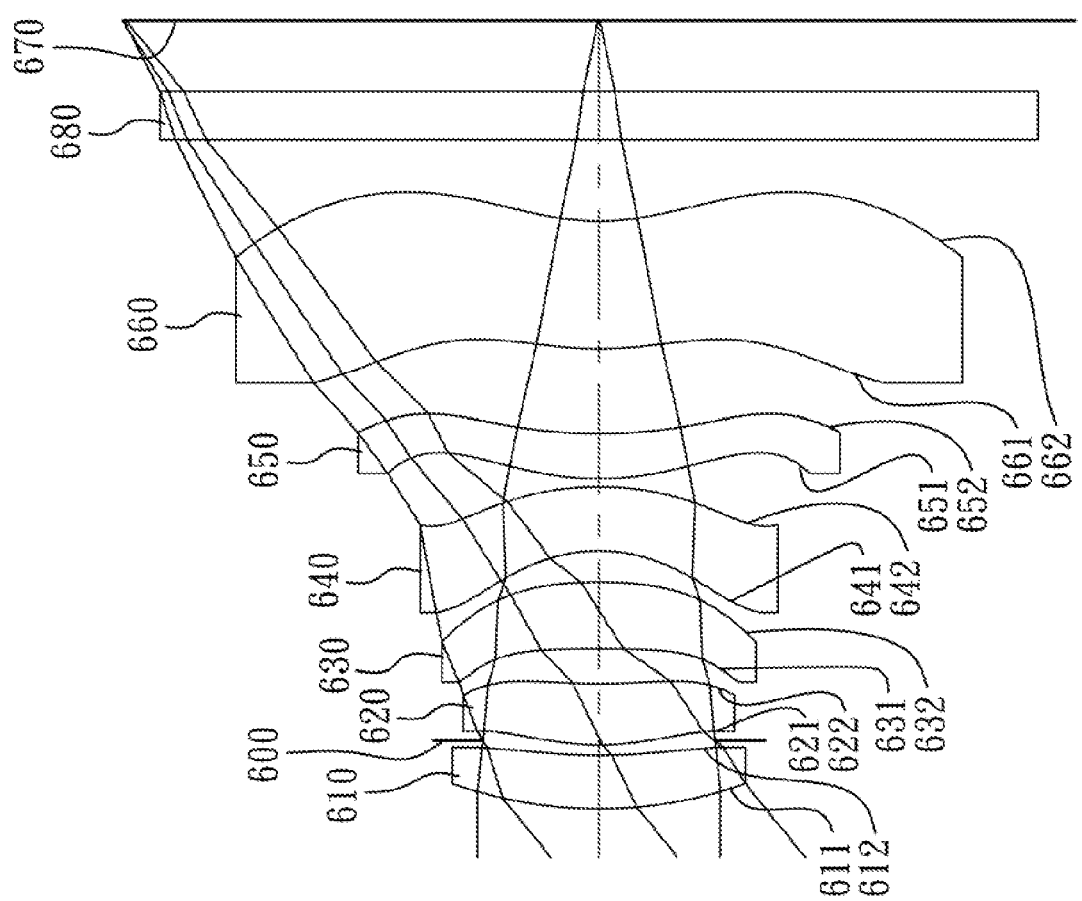
FIG. 11 is a schematic view of an optical image lens system according to the 6th embodiment of the present disclosure.
Figure 12:
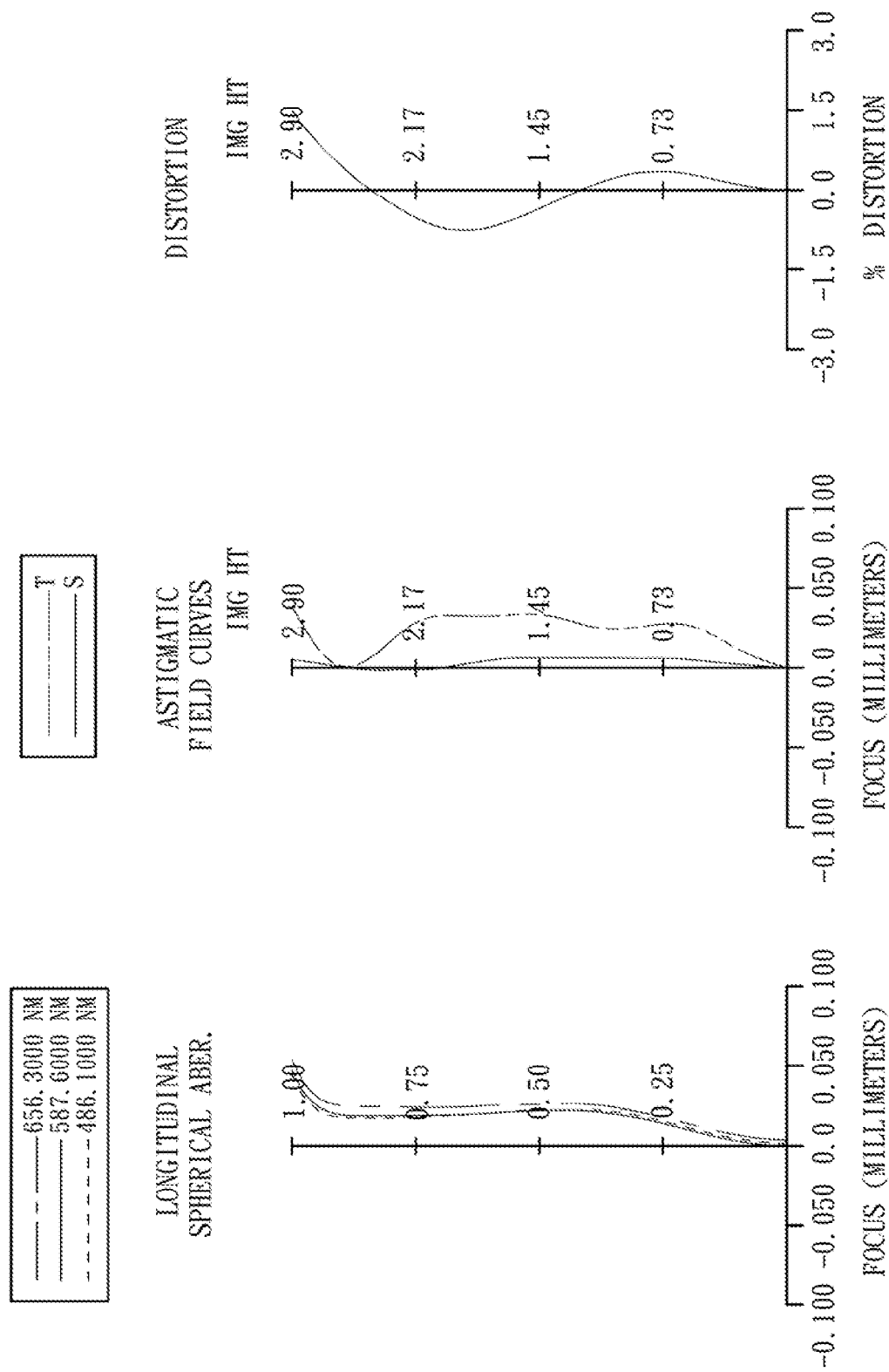
FIG. 12 shows spherical aberration curves, astigmatic field curves and a distortion curve of the optical image lens system according to the 6th embodiment.

FIG. 11 is a schematic view of an optical image lens system according to the 6th embodiment of the present disclosure. FIG. 12 shows spherical aberration curves, astigmatic field curves and a distortion curve of the optical image lens system according to the 6th embodiment. In FIG. 11, the optical image lens system includes, in order from an object side to an image side, a first lens element 610, an aperture stop 600, a second lens element 620, a third lens element 630, a fourth lens element 640, a fifth lens element 650, a sixth lens element 660, an IR-cut filter 680, and an image plane 670.

The first lens element 610 with positive refractive power has a convex object-side surface 611 and a concave image-side surface 612. The first lens element 610 is made of glass and has the object-side surface 611 and the image-side surface 612 being aspheric.

The second lens element 620 with positive refractive power has a convex object-side surface 621, and an image-side surface 622 of the second lens element 620 being concave at a paraxial region and being convex at a peripheral region. The second lens element 620 is made of plastic and has the object-side surface 621 and the image-side surface 622 being aspheric.

The third lens element 630 with positive refractive power has a concave object-side surface 631 and a convex image-side surface 632. The third lens element 630 is made of plastic and has the object-side surface 631 and the image-side surface 632 being aspheric.

The fourth lens element 640 with negative refractive power has a concave object-side surface 641 and a convex image-side surface 642. The fourth lens element 640 is made of plastic and has the object-side surface 641 and the image-side surface 642 being aspheric.

The fifth lens element 650 with positive refractive power has a convex object-side surface 651 and a concave image-side surface 652, wherein the object-side surface 651 of the fifth lens element 650 changes from convex at a paraxial region to concave at a peripheral region, and the image-side surface 652 of the fifth lens element 650 changes from concave at a paraxial region to convex at a peripheral region. The fifth lens element 650 is made of plastic and has the object-side surface 651 and the image-side surface 652 being aspheric.

The sixth lens element 660 with negative refractive power has a convex object-side surface 661 and a concave image-side surface 662, wherein the image-side surface 662 of the sixth lens element 660 changes from concave at a paraxial region to convex at a peripheral region. The sixth lens element 660 is made of plastic and has the object-side surface 661 and the image-side surface 662 being aspheric.

The IR-cut filter 680 is made of glass, wherein the IR-cut filter 680 is located between the sixth lens element 660 and the image plane 670, and will not affect the focal length of the optical image lens system.

The detailed optical data of the 6th embodiment are shown in Table 11 and the aspheric surface data are shown in Table 12 below.

TABLE 11

6th Embodiment
f = 3.55 mm, Fno = 2.40, HFOV = 38.7 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Lens 1 | 2.656 | (ASP) | 0.325 | Glass | 1.566 | 61.1 | 60.62 |
| 2 | | 2.752 | (ASP) | 0.089 | | | | |
| 3 | Ape. Stop | Plano | | −0.025 | | | | |
| 4 | Lens 2 | 1.514 | (ASP) | 0.372 | Plastic | 1.535 | 56.3 | 4.40 |
| 5 | | 3.888 | (ASP) | 0.208 | | | | |
| 6 | Lens 3 | −12.330 | (ASP) | 0.411 | Plastic | 1.535 | 56.3 | 5.99 |

TABLE 11-continued

6th Embodiment
f = 3.55 mm, Fno = 2.40, HFOV = 38.7 deg.

| Surface # | | Curvature Radius | | Thickness | Material | Index | Abbe # | Focal length |
|---|---|---|---|---|---|---|---|---|
| 7 | | −2.572 | (ASP) | 0.190 | | | | |
| 8 | Lens 4 | −1.001 | (ASP) | 0.389 | Plastic | 1.650 | 21.4 | −3.55 |
| 9 | | −2.040 | (ASP) | 0.050 | | | | |
| 10 | Lens 5 | 1.725 | (ASP) | 0.276 | Plastic | 1.544 | 55.9 | 5.37 |
| 11 | | 3.976 | (ASP) | 0.517 | | | | |
| 12 | Lens 6 | 2.141 | (ASP) | 0.776 | Plastic | 1.544 | 55.9 | −12.50 |
| 13 | | 1.421 | (ASP) | 0.492 | | | | |
| 14 | IR-cut filter | Plano | | 0.300 | Glass | 1.517 | 64.2 | — |
| 15 | | Plano | | 0.430 | | | | |
| 16 | Image | Plano | | — | | | | |

Reference wavelength (d-line) is 587.6 nm

TABLE 12

Aspheric Coefficients

| | Surface # | | | | | |
|---|---|---|---|---|---|---|
| | 1 | 2 | 4 | 5 | 6 | 7 |
| k = | 4.2948E+00 | −1.9971E+01 | −7.1166E+00 | −1.1307E+00 | 3.0000E+00 | 1.9482E+00 |
| A4 = | −5.3764E−02 | −2.8956E−01 | −2.7054E−01 | −2.3343E−01 | −2.1361E−01 | −2.1431E−01 |
| A6 = | 7.6989E−02 | 8.4178E−01 | 6.1799E−01 | −2.0297E−01 | −1.6889E−01 | −9.1265E−02 |
| A8 = | −1.3702E−01 | −1.4866E+00 | −1.4504E+00 | 6.3946E−02 | −1.2225E−01 | 1.4366E−01 |
| A10 = | 9.7621E−02 | 1.3416E+00 | 1.3445E+00 | −2.3253E−01 | −5.8906E−02 | 7.2356E−02 |
| A12 = | −4.4114E−02 | −5.0718E−01 | −6.0009E−01 | 5.0831E−02 | −2.2991E−02 | −2.6183E−01 |
| A14 = | | | | 4.4139E−01 | 5.4529E−01 | 1.6530E−01 |

| | Surface # | | | | | |
|---|---|---|---|---|---|---|
| | 8 | 9 | 10 | 11 | 12 | 13 |
| k = | −2.0493E+00 | 1.9495E+00 | −7.8073E+00 | 3.0000E+00 | −9.6384E+00 | −3.3284E+00 |
| A4 = | −2.2537E−01 | −1.8783E−01 | 7.8826E−02 | 1.7557E−01 | −1.9002E−01 | −1.8222E−01 |
| A6 = | 1.0985E−01 | 3.1050E−01 | −1.9025E−01 | −3.8131E−01 | 3.5324E−02 | 9.7623E−02 |
| A8 = | 4.9762E−01 | −3.5702E−02 | 9.2275E−02 | 3.0878E−01 | 1.8523E−02 | −4.2574E−02 |
| A10 = | −6.5566E−01 | −9.9840E−02 | −3.0406E−02 | −1.7157E−01 | −1.0336E−02 | 1.2934E−02 |
| A12 = | 4.6886E−01 | 1.1468E−01 | −9.2850E−04 | 6.0698E−02 | 2.2036E−03 | −2.4524E−03 |
| A14 = | −1.6181E−01 | −2.5520E−02 | 2.3757E−03 | −1.1501E−02 | −2.3069E−04 | 2.5592E−04 |
| A16 = | | | | 8.6055E−04 | 9.7129E−06 | −1.1161E−05 |

In the optical image lens system according to the 6th embodiment, the definitions of f, Fno, HFOV, V4, V5, R5, R6, R9, f1, f2, f3, f4, and FOV are the same as those stated in the 1st embodiment with corresponding values for the 6th embodiment. Moreover, these parameters can be calculated from Table 11 and Table 12 as the following values and satisfy the following relationships:

| | | | |
|---|---|---|---|
| f (mm) | 3.55 | |f/f1| + |f/f2| | 0.87 |
| Fno | 2.40 | f/f2 | 0.81 |
| HFOV (deg.) | 38.7 | f3/f2 | 1.36 |
| V4/V5 | 0.38 | f/f4 | −1.00 |
| (R5 + R6)/(R5 − R6) | 1.53 | FOV (deg.) | 77.4 |
| R9/f | 0.49 | | |

7th Embodiment

Figure 13:
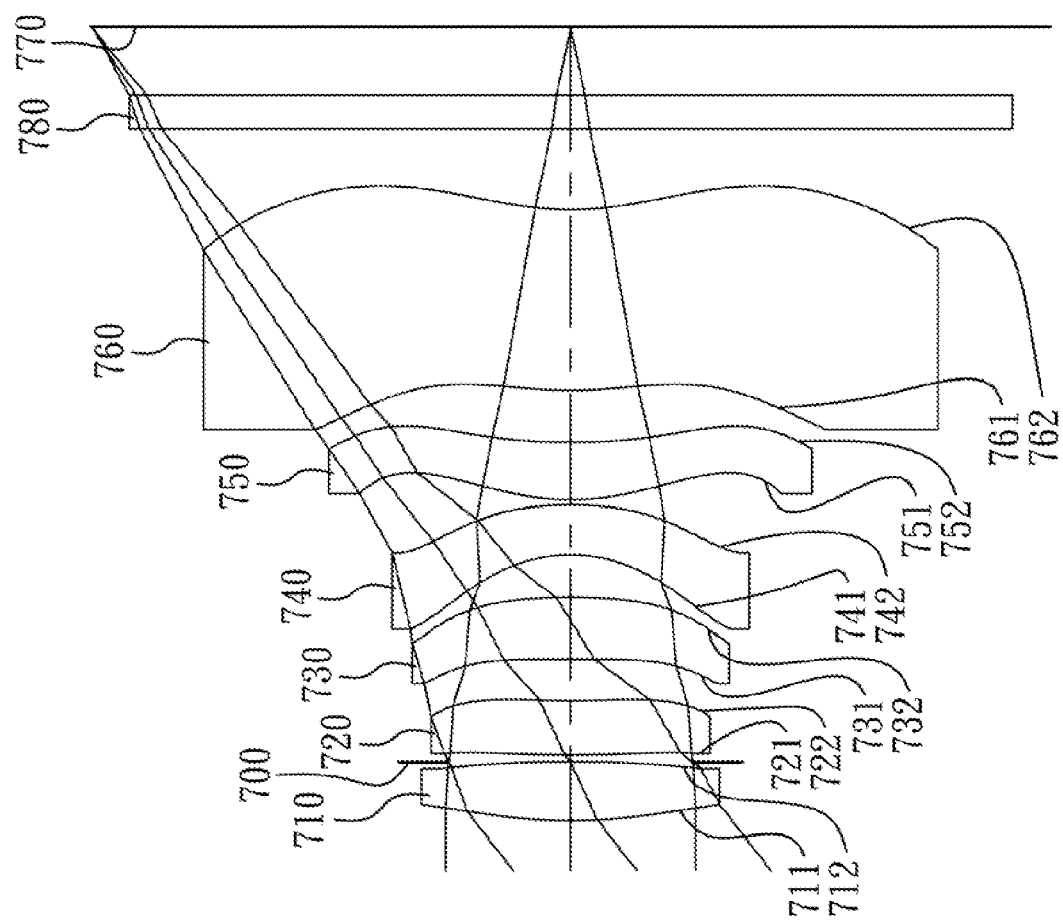
FIG. 13 is a schematic view of an optical image lens system according to the 7th embodiment of the present disclosure.
Figure 14:
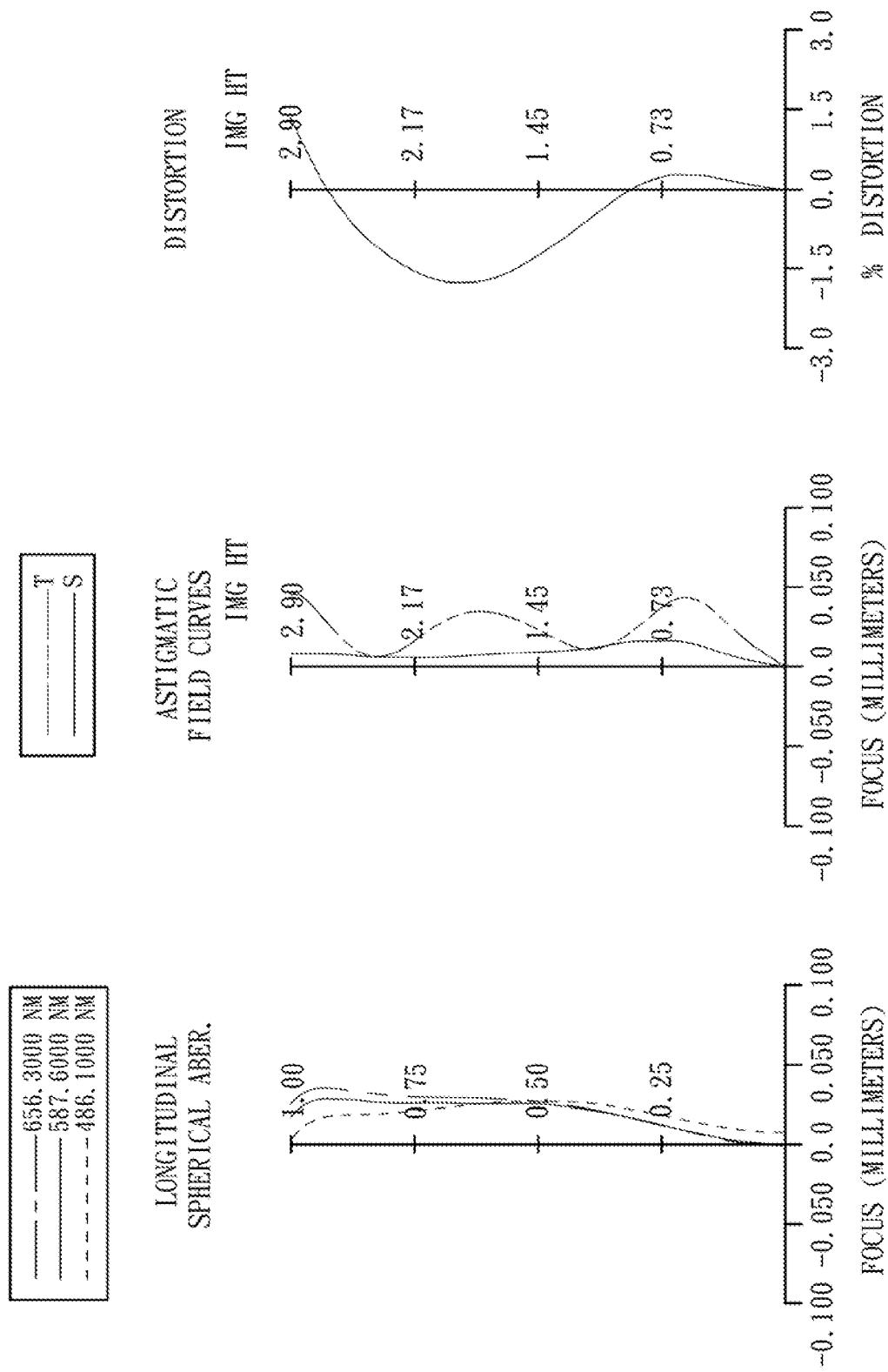
FIG. 14 shows spherical aberration curves, astigmatic field curves and a distortion curve of the optical image lens system according to the 7th embodiment.

FIG. 13 is a schematic view of an optical image lens system according to the 7th embodiment of the present disclosure. FIG. 14 shows spherical aberration curves, astigmatic field curves and a distortion curve of the optical image lens system according to the 7th embodiment. In FIG. 13, the optical image lens system includes, in order from an object side to an image side, a first lens element 710, an aperture stop 700, a second lens element 720, a third lens element 730, a fourth lens element 740, a fifth lens element 750, a sixth lens element 760, an IR-cut filter 780, and an image plane 770.

The first lens element 710 with positive refractive power has a convex object-side surface 711 and a convex image-side surface 712. The first lens element 710 is made of glass and has the object-side surface 711 and the image-side surface 712 being aspheric.

The second lens element 720 with positive refractive power has a convex object-side surface 721, and an image-side surface 722 of the second lens element 720 being concave at a paraxial region and being convex at a peripheral region. The second lens element 720 is made of plastic and has the object-side surface 721 and the image-side surface 722 being aspheric.

The third lens element 730 with positive refractive power has a concave object-side surface 731 and a convex image-side surface 732. The third lens element 730 is made of plastic and has the object-side surface 731 and the image-side surface 732 being aspheric.

The fourth lens element 740 with negative refractive power has a concave object-side surface 741 and a convex image-side surface 742. The fourth lens element 740 is made of plastic and has the object-side surface 741 and the image-side surface 742 being aspheric.

The fifth lens element 750 with positive refractive power has a convex object-side surface 751 and a concave image-side surface 752, wherein the object-side surface 751 of the fifth lens element 750 changes from convex at a paraxial region to concave at a peripheral region, and the image-side surface 752 of the fifth lens element 750 changes from concave at a paraxial region to convex at a peripheral region. The fifth lens element 750 is made of plastic and has the object-side surface 751 and the image-side surface 752 being aspheric.

The sixth lens element 760 with negative refractive power has a convex object-side surface 761 and a concave image-side surface 762, wherein the image-side surface 762 of the sixth lens element 760 changes from concave at a paraxial region to convex at a peripheral region. The sixth lens element 760 is made of plastic and has the object-side surface 761 and the image-side surface 762 being aspheric.

The IR-cut filter 780 is made of glass, wherein the IR-cut filter 780 is located between the sixth lens element 760 and the image plane 770, and will not affect the focal length of the optical image lens system.

The detailed optical data of the 7th embodiment are shown in Table 13 and the aspheric surface data are shown in Table 14 below.

TABLE 13

7th Embodiment
f = 3.62 mm, Fno = 2.40, HFOV = 38.1 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Lens 1 | 3.007 | (ASP) | 0.359 | Glass | 1.566 | 61.1 | 4.39 |
| 2 | | −13.655 | (ASP) | −0.002 | | | | |
| 3 | Ape. Stop | Plano | | 0.042 | | | | |
| 4 | Lens 2 | 5.519 | (ASP) | 0.330 | Plastic | 1.544 | 55.9 | 55.23 |
| 5 | | 6.617 | (ASP) | 0.250 | | | | |
| 6 | Lens 3 | −79.462 | (ASP) | 0.371 | Plastic | 1.535 | 56.3 | 7.40 |
| 7 | | −3.773 | (ASP) | 0.261 | | | | |
| 8 | Lens 4 | −0.879 | (ASP) | 0.300 | Plastic | 1.640 | 23.3 | −2.45 |
| 9 | | −2.271 | (ASP) | 0.030 | | | | |
| 10 | Lens 5 | 1.419 | (ASP) | 0.350 | Plastic | 1.535 | 56.3 | 3.73 |
| 11 | | 4.503 | (ASP) | 0.315 | | | | |
| 12 | Lens 6 | 2.486 | (ASP) | 1.091 | Plastic | 1.535 | 56.3 | −21.63 |
| 13 | | 1.733 | (ASP) | 0.492 | | | | |
| 14 | IR-cut filter | Plano | | 0.200 | Glass | 1.517 | 64.2 | — |
| 15 | | Plano | | 0.418 | | | | |
| 16 | Image | Plano | | — | | | | |

Reference wavelength (d-line) is 587.6 nm

TABLE 14

Aspheric Coefficients

| | Surface # | | | | | |
|---|---|---|---|---|---|---|
| | 1 | 2 | 4 | 5 | 6 | 7 |
| k = | −5.3465E+00 | −2.0000E+01 | −4.3709E+00 | −3.7876E+01 | 3.0000E+00 | 1.4261E+00 |
| A4 = | −3.8058E−02 | −2.1436E−01 | −2.7597E−01 | −2.4235E−01 | −1.9167E−01 | −1.5389E−01 |
| A6 = | −1.9863E−03 | 6.7641E−01 | 7.8498E−01 | −1.0461E−02 | −1.3318E−01 | −1.4618E−01 |
| A8 = | −4.8107E−02 | −1.3026E+00 | −1.4977E+00 | −1.2417E−02 | −3.4296E−02 | 3.7483E−02 |
| A10 = | 5.6701E−02 | 1.3894E+00 | 1.4234E+00 | −2.9421E−01 | 2.3902E−01 | 1.7933E−01 |
| A12 = | −4.3625E−03 | −5.8702E−01 | −6.8378E−01 | 4.4774E−01 | −2.2172E−01 | −1.7409E−01 |
| A14 = | | | | −2.1016E−01 | 1.8272E−01 | 9.4812E−02 |

| | Surface # | | | | | |
|---|---|---|---|---|---|---|
| | 8 | 9 | 10 | 11 | 12 | 13 |
| k = | −3.6405E+00 | 1.9833E+00 | −1.0260E+01 | 3.0000E+00 | −2.0000E+01 | −2.7599E+00 |
| A4 = | −3.7102E−01 | −3.0475E−01 | 7.8826E−02 | 1.7557E−01 | −1.9002E−01 | −1.8222E−01 |
| A6 = | 4.2762E−02 | 3.1175E−01 | −1.9025E−01 | −3.8131E−01 | 3.5324E−02 | 9.7623E−02 |
| A8 = | 5.6911E−01 | 9.1448E−03 | 9.2275E−02 | 3.0878E−01 | 1.8523E−02 | −4.2574E−02 |
| A10 = | −6.4186E−01 | −9.9690E−02 | −3.0406E−02 | −1.7157E−01 | −1.0336E−02 | 1.2934E−02 |
| A12 = | 4.6575E−01 | 8.9921E−02 | −9.2850E−04 | 6.0698E−02 | 2.2036E−03 | −2.4524E−03 |
| A14 = | −1.6204E−01 | −2.2821E−02 | 2.3757E−03 | −1.1501E−02 | −2.3069E−04 | 2.5592E−04 |
| A16 = | | | | 8.6055E−04 | 9.7129E−06 | −1.1161E−05 |

In the optical image lens system according to the 7th embodiment, the definitions of f, Fno, HFOV, V4, V5, R5, R6, R9, f1, f2, f3, f4, and FOV are the same as those stated in the 1st embodiment with corresponding values for the 7th embodiment. Moreover, these parameters can be calculated from Table 13 and Table 14 as the following values and satisfy the following relationships:

| | | | |
|---|---|---|---|
| f (mm) | 3.62 | |f/f1| + |f/f2| | 0.89 |
| Fno | 2.40 | f/f2 | 0.07 |
| HFOV (deg.) | 38.1 | f3/f2 | 0.13 |
| V4/V5 | 0.41 | f/f4 | −1.48 |
| (R5 + R6)/(R5 − R6) | 1.10 | FOV (deg.) | 76.2 |
| R9/f | 0.39 | | |

8th Embodiment

Figure 15:
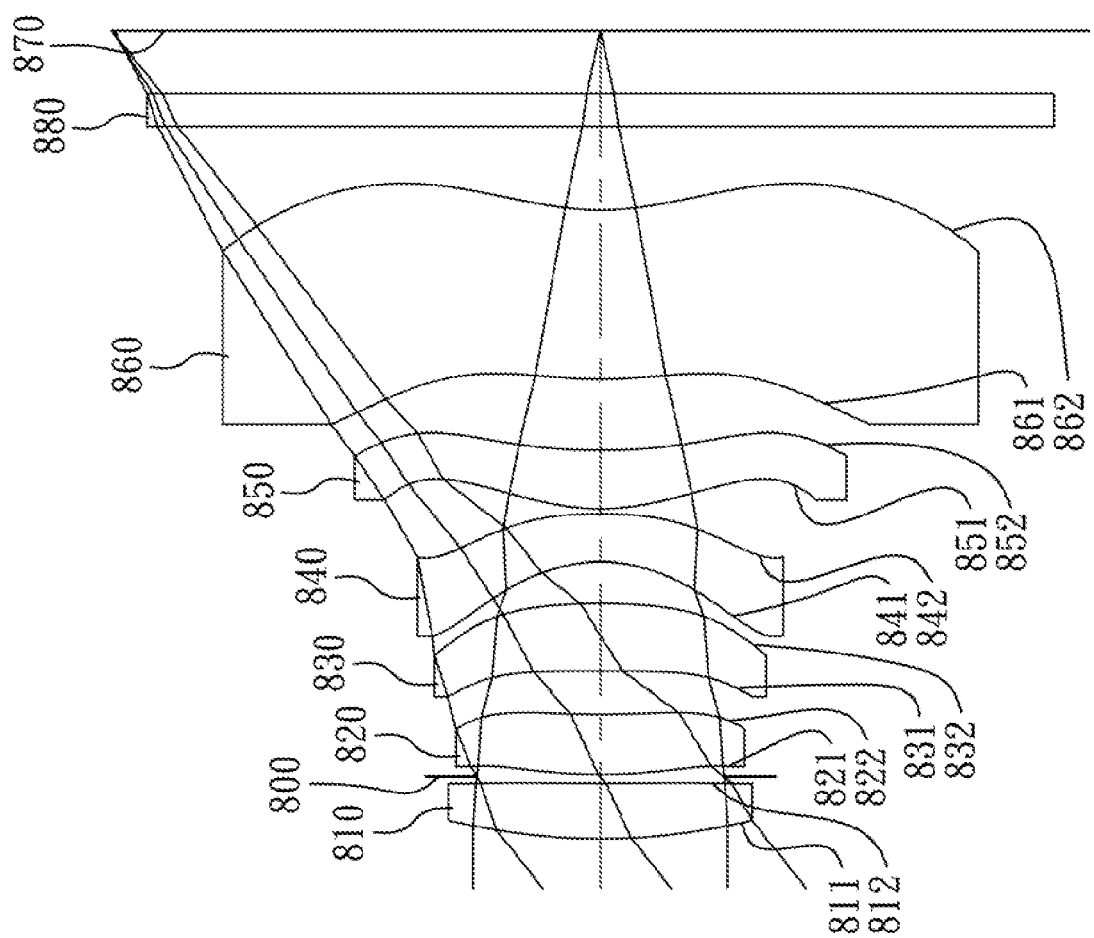
FIG. 15 is a schematic view of an optical image lens system according to the 8th embodiment of the present disclosure.
Figure 16:
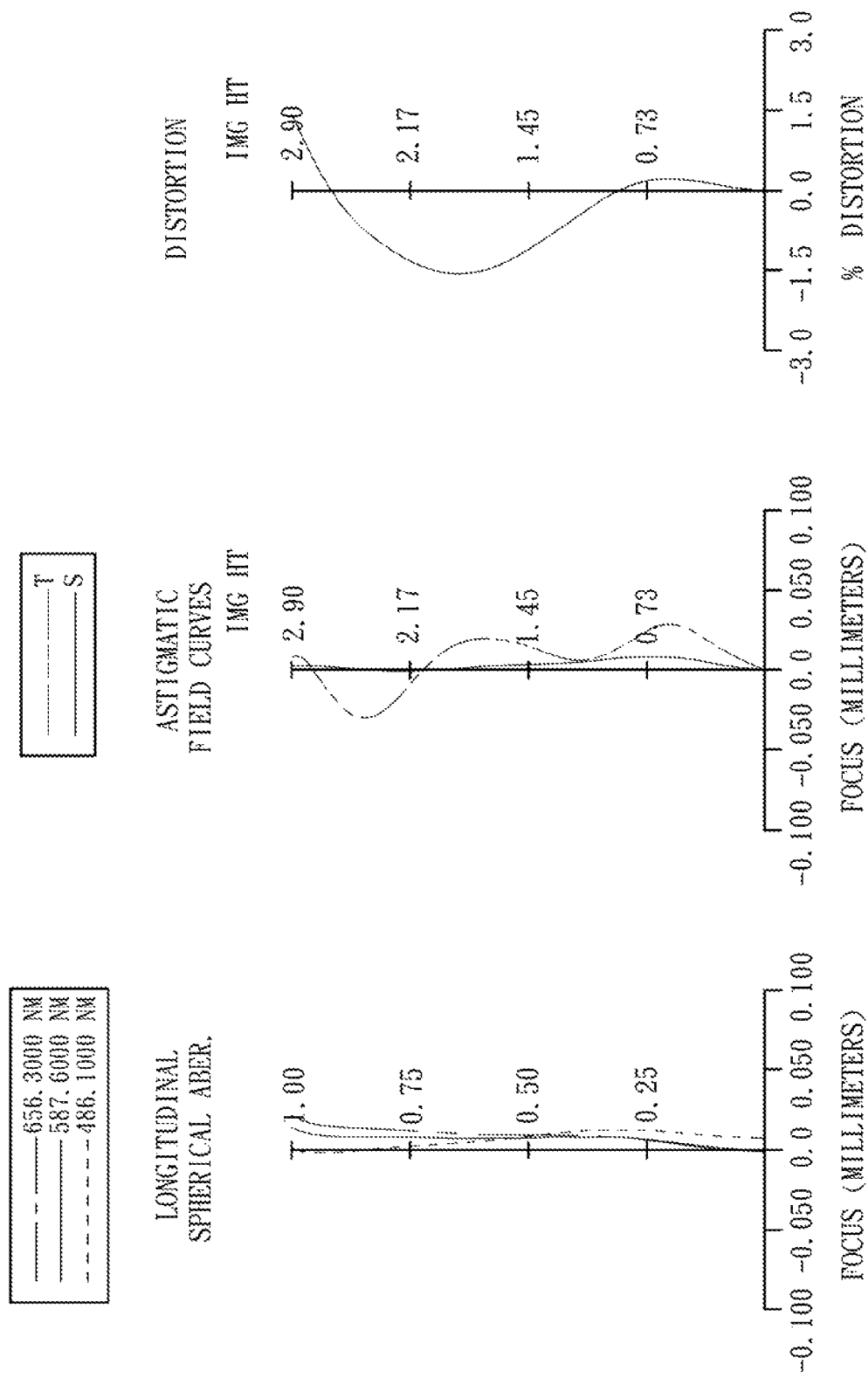
FIG. 16 shows spherical aberration curves, astigmatic field curves and a distortion curve of the optical image lens system according to the 8th embodiment.

FIG. 15 is a schematic view of an optical image lens system according to the 8th embodiment of the present disclosure. FIG. 16 shows spherical aberration curves, astigmatic field curves and a distortion curve of the optical image lens system according to the 8th embodiment. In FIG. 15, the optical image lens system includes, in order from an object side to an image side, a first lens element 810, an aperture stop 800, a second lens element 820, a third lens element 830, a fourth lens element 840, a fifth lens element 850, a sixth lens element 860, an IR-cut filter 880, and an image plane 870.

The first lens element 810 with positive refractive power has a convex object-side surface 811 and a concave image-side surface 812. The first lens element 810 is made of glass and has the object-side surface 811 and the image-side surface 812 being aspheric.

The second lens element 820 with positive refractive power has a convex object-side surface 821, and an mage-side surface 822 of the second lens element 820 being concave at a paraxial region and being convex at a peripheral region. The second lens element 820 is made of plastic and has the object-side surface 821 and the image-side surface 822 being aspheric.

The third lens element 830 with positive refractive power has a concave object-side surface 831 and a convex image-side surface 832. The third lens element 830 is made of plastic and has the object-side surface 831 and the image-side surface 832 being aspheric.

The fourth lens element 840 with negative refractive power has a concave object-side surface 841 and a convex image-side surface 842. The fourth lens element 840 is made of plastic and has the object-side surface 841 and the image-side surface 842 being aspheric.

The fifth lens element 850 with positive refractive power has a convex object-side surface 851 and a concave image-side surface 852, wherein the object-side surface 851 of the fifth lens element 850 changes from convex at a paraxial region to concave at a peripheral region, and the image-side surface 852 of the fifth lens element 850 changes from concave at a paraxial region to convex at a peripheral region. The fifth lens element 850 is made of plastic and has the object-side surface 851 and the image-side surface 852 being aspheric.

The sixth lens element 860 with negative refractive power has a convex object-side surface 861 and a concave image-side surface 862, wherein the image-side surface 862 of the sixth lens element 860 changes from concave at a paraxial region to convex at a peripheral region. The sixth lens element 860 is made of plastic and has the object-side surface 861 and the image-side surface 862 being aspheric.

The IR-cut filter 880 is made of glass, wherein the IR-cut filter 880 is located between the sixth lens element 860 and the image plane 870, and will not affect the focal length of the optical image lens system.

The detailed optical data of the 8th embodiment are shown in Table 15 and the aspheric surface data are shown in Table 16 below.

TABLE 15

8th Embodiment
f = 3.63 mm, Fno = 2.40, HFOV = 38.2 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Lens 1 | 3.352 | (ASP) | 0.330 | Glass | 1.566 | 61.1 | 8.21 |
| 2 | | 11.624 | (ASP) | 0.039 | | | | |
| 3 | Ape. Stop | Plano | | 0.039 | | | | |
| 4 | Lens 2 | 2.448 | (ASP) | 0.358 | Plastic | 1.544 | 55.9 | 8.70 |
| 5 | | 4.806 | (ASP) | 0.254 | | | | |
| 6 | Lens 3 | −66.196 | (ASP) | 0.405 | Plastic | 1.535 | 56.3 | 7.38 |
| 7 | | −3.730 | (ASP) | 0.247 | | | | |
| 8 | Lens 4 | −0.905 | (ASP) | 0.285 | Plastic | 1.640 | 23.3 | −2.43 |
| 9 | | −2.434 | (ASP) | 0.030 | | | | |
| 10 | Lens 5 | 1.260 | (ASP) | 0.350 | Plastic | 1.535 | 56.3 | 3.17 |
| 11 | | 4.436 | (ASP) | 0.422 | | | | |
| 12 | Lens 6 | 2.780 | (ASP) | 1.005 | Plastic | 1.535 | 56.3 | −10.98 |
| 13 | | 1.649 | (ASP) | 0.492 | | | | |
| 14 | IR-cut filter | Plano | | 0.200 | Glass | 1.517 | 64.2 | — |
| 15 | | Plano | | 0.372 | | | | |
| 16 | Image | Plano | | — | | | | |

Reference wavelength (d-line) is 587.6 nm

TABLE 16

Aspheric Coefficients

| Surface # | 1 | 2 | 4 | 5 | 6 | 7 |
|---|---|---|---|---|---|---|
| k = | −1.7194E+00 | −2.0000E+01 | −5.8614E+00 | −3.7713E+00 | −2.0000E+01 | −1.9327E+00 |
| A4 = | −2.8508E−02 | −2.4761E−01 | −2.9014E−01 | −2.3899E−01 | −1.6338E−01 | −1.4872E−01 |
| A6 = | 2.5950E−02 | 7.2404E−01 | 7.2707E−01 | −5.7750E−02 | −1.3753E−01 | −1.4627E−01 |
| A8 = | −3.7787E−02 | −1.3053E+00 | −1.4862E+00 | 1.4830E−02 | −4.4621E−02 | 2.7935E−02 |
| A10 = | 4.9944E−02 | 1.3461E+00 | 1.4898E+00 | −2.8004E−01 | 2.4670E−01 | 1.6575E−01 |
| A12 = | −2.5370E−02 | −6.0736E−01 | −7.9996E−01 | 4.1709E−01 | −2.1857E−01 | −1.8298E−01 |
| A14 = | | | | −1.7952E−01 | 1.5519E−01 | 9.2114E−02 |

| Surface # | 8 | 9 | 10 | 11 | 12 | 13 |
|---|---|---|---|---|---|---|
| k = | −4.5250E+00 | 2.4065E+00 | −9.5599E+00 | 3.0000E+00 | −2.0000E+01 | −2.8042E+00 |
| A4 = | −3.6769E−01 | −2.9794E−01 | 7.8826E−02 | 1.7557E−01 | −1.9002E−01 | −1.8222E−01 |
| A6 = | 3.8750E−02 | 3.0649E−01 | −1.9025E−01 | −3.8131E−01 | 3.5324E−02 | 9.7623E−02 |
| A8 = | 5.6229E−01 | 7.9559E−03 | 9.2275E−02 | 3.0878E−01 | 1.8523E−02 | −4.2574E−02 |
| A10 = | −6.5083E−01 | −9.7567E−02 | −3.0406E−02 | −1.7157E−01 | −1.0336E−02 | 1.2934E−02 |
| A12 = | 4.6041E−01 | 9.1247E−02 | −9.2850E−04 | 6.0698E−02 | 2.2036E−03 | −2.4524E−03 |
| A14 = | −1.5086E−01 | −2.3962E−02 | 2.3757E−03 | −1.1501E−02 | −2.3069E−04 | 2.5592E−04 |
| A16 = | | | | 8.6055E−04 | 9.7129E−06 | −1.1161E−05 |

In the optical image lens system according to the 8th embodiment, the definitions of f, Fno, HFOV, V4, V5, R5, R6, R9, f1, f2, f3, f4, and FOV are the same as those stated in the 1st embodiment with corresponding values for the 8th embodiment. Moreover, these parameters can be calculated from Table 15 and Table 16 as the following values and satisfy the following relationships:

| | | | |
|---|---|---|---|
| f (mm) | 3.63 | |f/f1| + |f/f2| | 0.86 |
| Fno | 2.40 | f/f2 | 0.42 |
| HFOV (deg.) | 38.2 | f3/f2 | 0.85 |
| V4/V5 | 0.41 | f/f4 | −1.49 |
| (R5 + R6)/(R5 − R6) | 1.12 | FOV (deg.) | 76.4 |
| R9/f | 0.35 | | |

9th Embodiment

Figure 17:
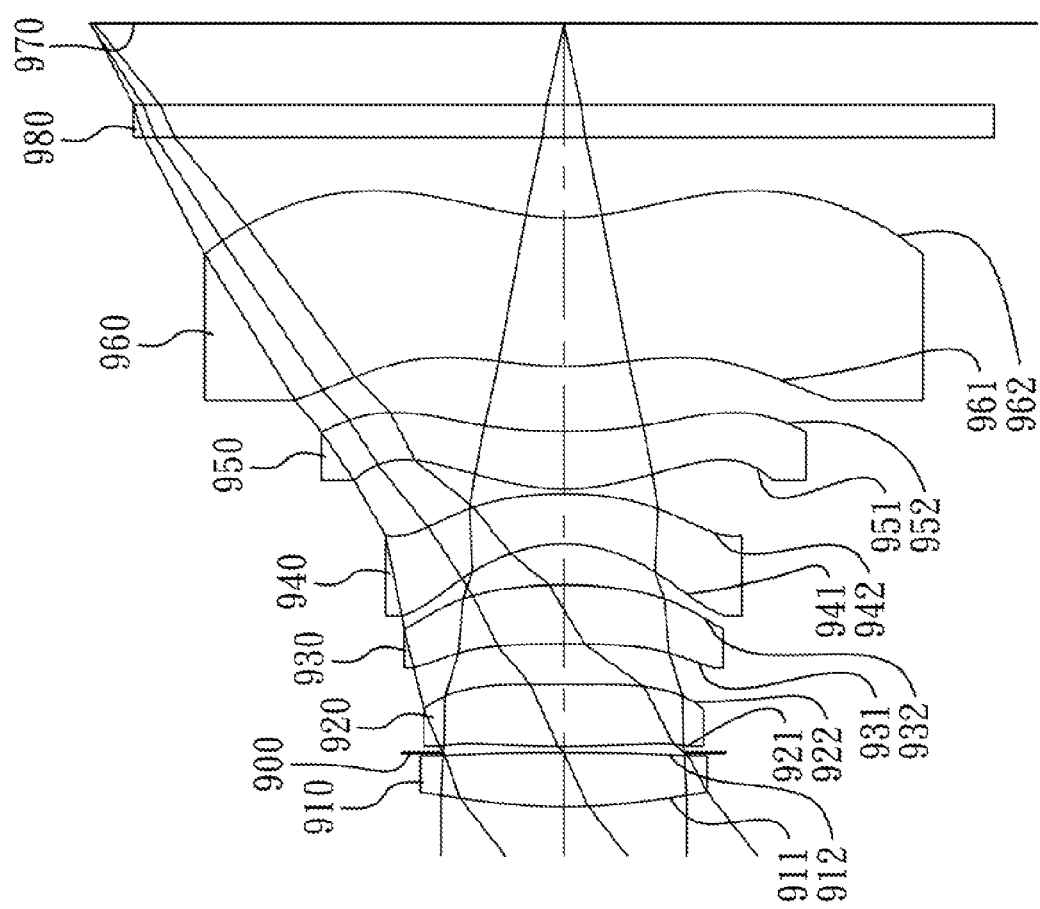
FIG. 17 is a schematic view of an optical image lens system according to the 9th embodiment of the present disclosure.
Figure 18:
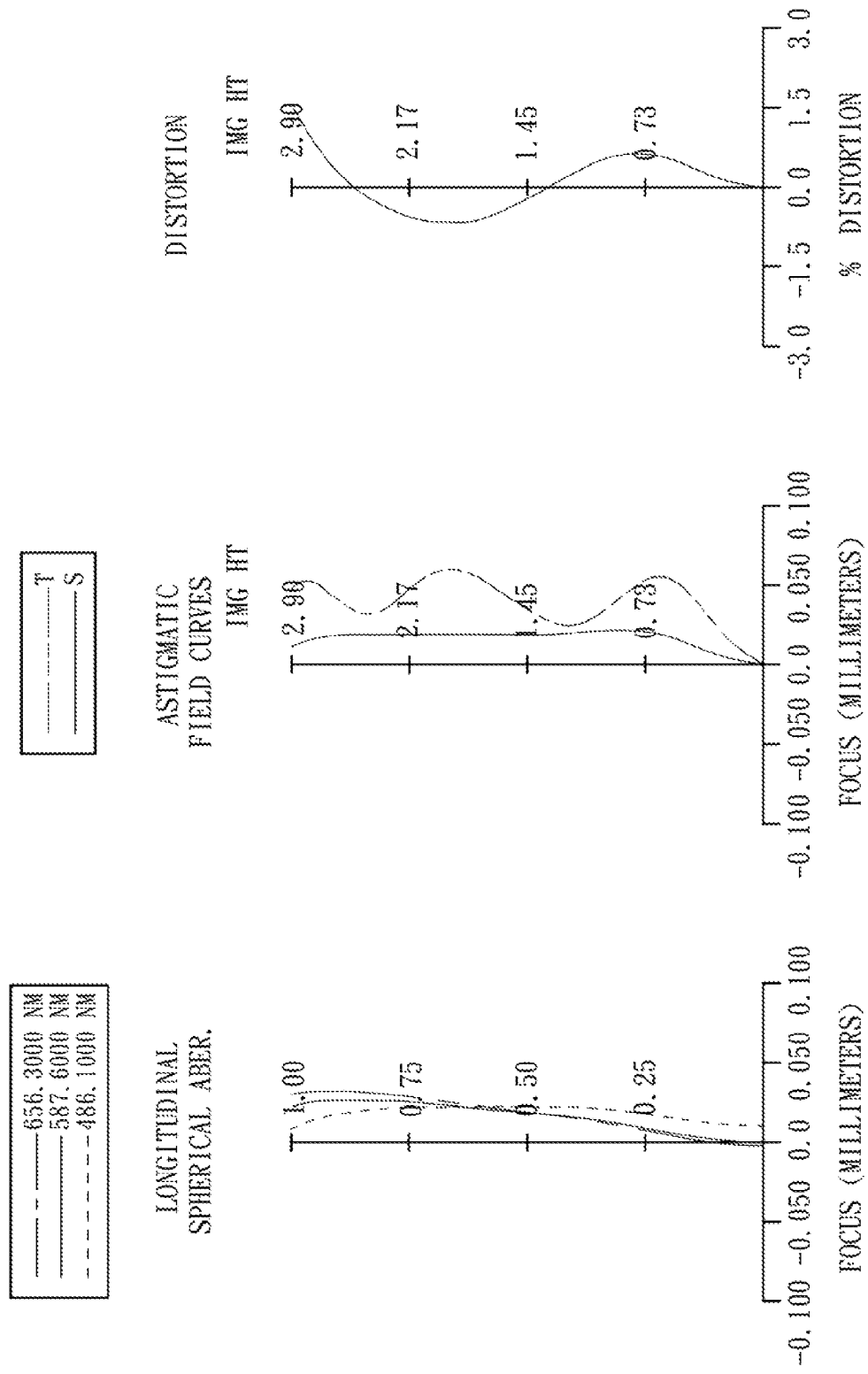
FIG. 18 shows spherical aberration curves, astigmatic field curves and a distortion curve of the optical image lens system according to the 9th embodiment.

FIG. 17 is a schematic view of an optical image lens system according to the 9th embodiment of the present disclosure. FIG. 18 shows spherical aberration curves, astigmatic field curves and a distortion curve of the optical image lens system according to the 9th embodiment. In FIG. 17, the optical image lens system includes, in order from an object side to an image side, a first lens element 910, an aperture stop 900, a second lens element 920, a third lens element 930, a fourth lens element 940, a fifth lens element 950, a sixth lens element 960, an IR-cut filter 980, and an image plane 970.

The first lens element 910 with positive refractive power has a convex object-side surface 911 and a concave image-side surface 912. The first lens element 910 is made of glass and has the object-side surface 911 and the image-side surface 912 being aspheric.

The second lens element 920 with positive refractive power has a convex object-side surface 921 and a convex image-side surface 922. The second lens element 920 is made of plastic and has the object-side surface 921 and the image-side surface 922 being aspheric.

The third lens element 930 with positive refractive power has a concave object-side surface 931 and a convex image-side surface 932. The third lens element 930 is made of plastic and has the object-side surface 931 and the image-side surface 932 being aspheric.

The fourth lens element 940 with negative refractive power has a concave object-side surface 941 and a convex image-side surface 942. The fourth lens element 940 is made of plastic and has the object-side surface 941 and the image-side surface 942 being aspheric.

The fifth lens element 950 with positive refractive power has a convex object-side surface 951 and a concave image-side surface 952, wherein the object-side surface 951 of the fifth lens element 950 changes from convex at a paraxial region to concave at a peripheral region, and the image-side surface 952 of the fifth lens element 950 changes from concave at a paraxial region to convex at a peripheral region. The fifth lens element 950 is made of plastic and has the object-side surface 951 and the image-side surface 952 being aspheric.

The sixth lens element 960 with negative refractive power has a convex object-side surface 961 and a concave image-side surface 962, wherein the image-side surface 962 of the sixth lens element 960 changes from concave at a paraxial region to convex at a peripheral region. The sixth lens element 960 is made of plastic and has the object-side surface 961 and the image-side surface 962 being aspheric.

The IR-cut filter 980 is made of glass, wherein the IR-cut filter 980 is located between the sixth lens element 960 and the image plane 970, and will not affect the focal length of the optical image lens system.

The detailed optical data of the 9th embodiment are shown in Table 17 and the aspheric surface data are shown in Table 18 below.

TABLE 17

9th Embodiment
f = 3.61 mm, Fno = 2.40, HFOV = 38.2 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 3.233 (ASP) | 0.331 | Glass | 1.566 | 61.1 | 6.09 |
| 2 | | 50.580 (ASP) | 0.000 | | | | |
| 3 | Ape. Stop | Plano | 0.040 | | | | |
| 4 | Lens 2 | 4.736 (ASP) | 0.376 | Plastic | 1.544 | 55.9 | 8.66 |
| 5 | | −917.431 (ASP) | 0.250 | | | | |
| 6 | Lens 3 | −8.929 (ASP) | 0.360 | Plastic | 1.535 | 56.3 | 9.07 |
| 7 | | −3.185 (ASP) | 0.250 | | | | |
| 8 | Lens 4 | −0.885 (ASP) | 0.310 | Plastic | 1.640 | 23.3 | −2.29 |
| 9 | | −2.543 (ASP) | 0.030 | | | | |
| 10 | Lens 5 | 1.306 (ASP) | 0.350 | Plastic | 1.535 | 56.3 | 3.47 |
| 11 | | 3.996 (ASP) | 0.402 | | | | |
| 12 | Lens 6 | 2.086 (ASP) | 0.910 | Plastic | 1.535 | 56.3 | −30.15 |
| 13 | | 1.567 (ASP) | 0.492 | | | | |
| 14 | IR-cut filter | Plano | 0.200 | Glass | 1.517 | 64.2 | — |
| 15 | | Plano | 0.499 | | | | |
| 16 | Image | Plano | — | | | | |

Reference wavelength (d-line) is 587.6 nm

TABLE 18

Aspheric Coefficients

| Surface # | 1 | 2 | 4 | 5 | 6 | 7 |
|---|---|---|---|---|---|---|
| k = | −6.6696E+00 | 3.0000E+00 | −2.7243E+00 | −1.1367E+06 | −2.0000E+01 | −2.8960E+00 |
| A4 = | −4.2583E−02 | −2.5116E−01 | −2.8616E−01 | −2.1773E−01 | −1.5590E−01 | −1.3402E−01 |
| A6 = | 2.4025E−02 | 7.1515E−01 | 7.1316E−01 | −6.7199E−02 | −1.0564E−01 | −1.1398E−01 |
| A8 = | −4.7855E−02 | −1.3143E+00 | −1.5094E+00 | 1.8394E−02 | 3.5621E−04 | 3.3246E−02 |
| A10 = | 3.9453E−02 | 1.3484E+00 | 1.4700E+00 | −2.5422E−01 | 2.7096E−01 | 1.6329E−01 |
| A12 = | 1.2321E−02 | −5.3101E−01 | −7.2780E−01 | 4.3056E−01 | −2.2734E−01 | −1.7814E−01 |
| A14 = | | | | −2.3397E−01 | 1.2124E−01 | 1.0430E−01 |

| Surface # | 8 | 9 | 10 | 11 | 12 | 13 |
|---|---|---|---|---|---|---|
| k = | −3.8775E+00 | 2.5785E+00 | −9.0832E+00 | 3.0000E+00 | −1.1867E+01 | −3.0883E+00 |
| A4 = | −3.5156E−01 | −3.0132E−01 | 7.8826E−02 | 1.7557E−01 | −1.9002E−01 | −1.8222E−01 |
| A6 = | 5.1129E−02 | 3.0096E−01 | −1.9025E−01 | −3.8131E−01 | 3.5324E−02 | 9.7623E−02 |
| A8 = | 5.6625E−01 | 1.0006E−02 | 9.2275E−02 | 3.0878E−01 | 1.8523E−02 | −4.2574E−02 |
| A10 = | −6.5299E−01 | −9.5128E−02 | −3.0406E−02 | −1.7157E−01 | −1.0336E−02 | 1.2934E−02 |
| A12 = | 4.5690E−01 | 9.0740E−02 | −9.2850E−04 | 6.0698E−02 | 2.2036E−03 | −2.4524E−03 |
| A14 = | −1.5103E−01 | −2.7069E−02 | 2.3757E−03 | −1.1501E−02 | −2.3069E−04 | 2.5592E−04 |
| A16 = | | | | 8.6055E−04 | 9.7129E−06 | −1.1161E−05 |

In the optical image lens system according to the 9th embodiment, the definitions of f, Fno, HFOV, V4, V5, R5, R6, R9, f1, f2, f3, f4, and FOV are the same as those stated in the 1st embodiment with corresponding values for the 9th embodiment. Moreover, these parameters can be calculated from Table 17 and Table 18 as the following values and satisfy the following relationships:

| | | | |
|---|---|---|---|
| f (mm) | 3.61 | |f/f1| + |f/f2| | 1.01 |
| Fno | 2.40 | f/f2 | 0.42 |
| HFOV (deg.) | 38.2 | f3/f2 | 1.05 |
| V4/V5 | 0.41 | f/f4 | −1.58 |
| (R5 + R6)/(R5 − R6) | 2.11 | FOV (deg.) | 76.4 |
| R9/f | 0.36 | | |

10th Embodiment

Figure 19:
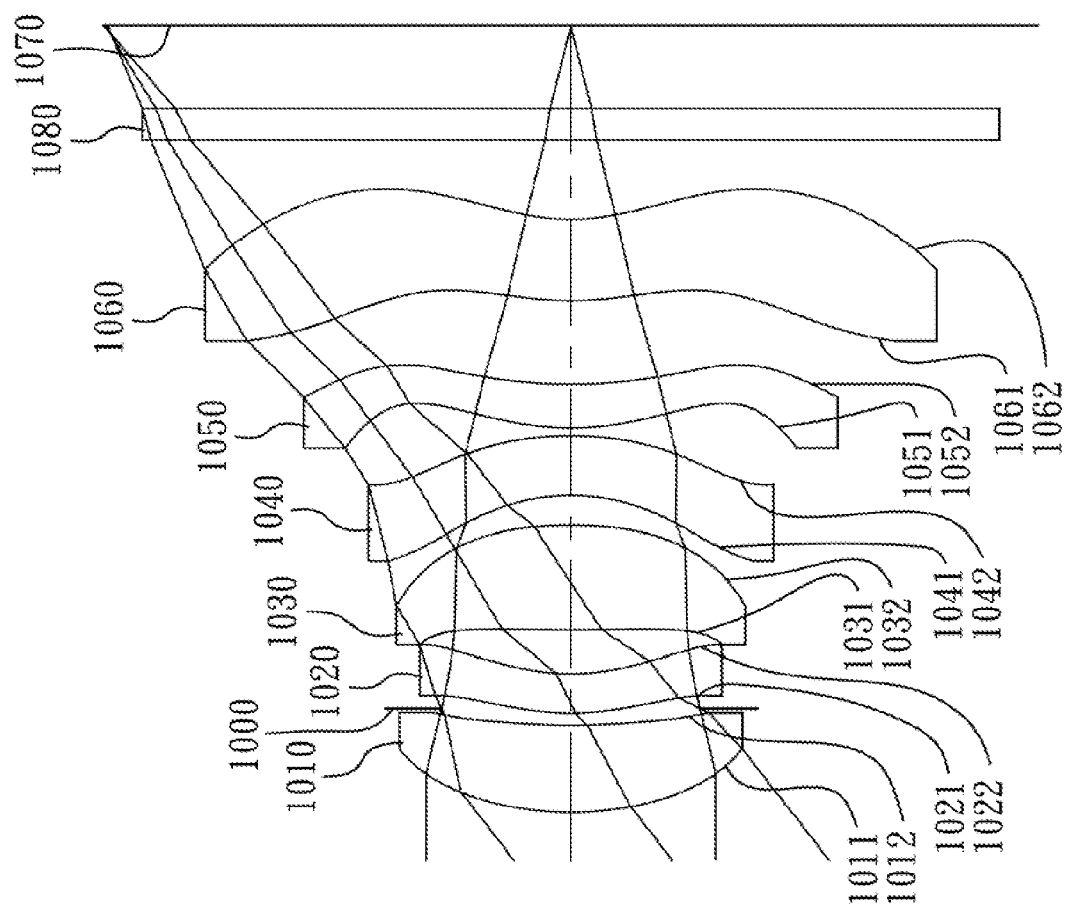
FIG. 19 is a schematic view of an optical image lens system according to the 10th embodiment of the present disclosure.
Figure 20:
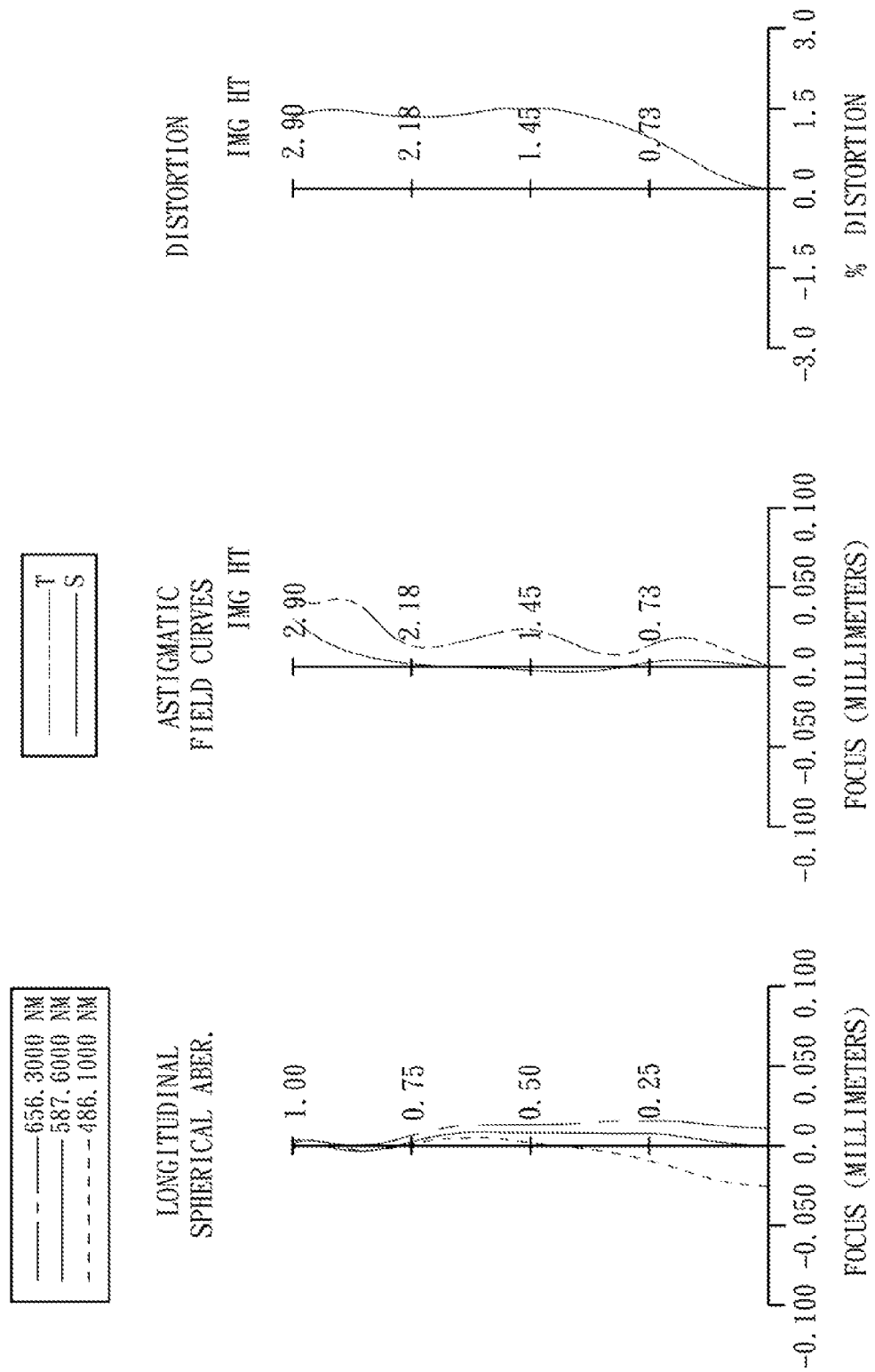
FIG. 20 shows spherical aberration curves, astigmatic field curves and a distortion curve of the optical image lens system according to the 10th embodiment.

FIG. 9 is a schematic view of an optical image lens system according to the 10th embodiment of the present disclosure. FIG. 20 shows spherical aberration curves, astigmatic field curves and a distortion curve of the optical image lens system according to the 10th embodiment. In FIG. 19, the optical image lens system includes, in order from an object side to an image side, a first lens element 1010, aperture stop 1000, a second lens element 1020, a third lens element 1030, a fourth lens element 1040, a fifth lens element 1050, a sixth lens element 1060, an IR-cut filter 1080, and an image plane 1070.

The first lens element 1010 with positive refractive power has a convex object-side surface 1011 and a concave image-side surface 1012. The first lens element 1010 is made of plastic and has the object-side surface 1011 and the image-side surface 1012 being aspheric.

The second lens element 1020 with positive refractive power has a convex object-side surface 1021, and an image-side surface 1022 of the second lens element 1020 being concave at a paraxial region and being convex at a peripheral region. The second lens element 1020 is made of plastic and has the object-side surface 1021 and the image-side surface 1022 being aspheric.

The third lens element 1030 with positive refractive power has a convex object-side surface 1031 and a convex image-side surface 1032. The third lens element 1030 is made of plastic and has the object-side surface 1031 and the image-side surface 1032 being aspheric.

The fourth lens element 1040 with negative refractive power has a concave object-side surface 1041 and a convex image-side surface 1042. The fourth lens element 1040 is made of plastic and has the object-side surface 1041 and the image-side surface 1042 being aspheric.

The fifth lens element 1050 with positive refractive power has a convex object-side surface 1051 and a concave image-side surface 1052, wherein the object-side surface 1051 of the fifth lens element 1050 changes from convex at a paraxial region to concave at a peripheral region, and the image-side surface 1052 of the fifth lens element 1050 changes from concave at a paraxial region to convex at a peripheral region. The fifth lens element 1050 is made of plastic and has the object-side surface 1051 and the image-side surface 1052 being aspheric.

The sixth lens element 1060 with negative refractive power has a convex object-side surface 1061 and a concave image-side surface 1062, wherein the image-side surface 1062 of the sixth lens element 1060 changes from concave at a paraxial region to convex at a peripheral region. The sixth lens element 1060 is made of plastic and has the object-side surface 1061 and the image-side surface 1062 being aspheric.

The IR-cut filter 1080 is made of glass, wherein the IR-cut filter 1080 is located between the sixth lens element 1060 and the image plane 1070, and will not affect the focal length of the optical image lens system.

The detailed optical data of the 10th embodiment are shown in Table 19 and the aspheric surface data are shown in Table 20 below.

TABLE 19

10th Embodiment
$f = 3.69$ mm, Fno = 2.05, HFOV = 37.8 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Lens 1 | 2.009 | (ASP) | 0.545 | Plastic | 1.544 | 55.9 | 8.29 |
| 2 | | 3.276 | (ASP) | 0.104 | | | | |
| 3 | Ape. Stop | Plano | | −0.030 | | | | |
| 4 | Lens 2 | 1.397 | (ASP) | 0.246 | Plastic | 1.650 | 21.4 | 109.85 |
| 5 | | 1.326 | (ASP) | 0.271 | | | | |
| 6 | Lens 3 | 15.604 | (ASP) | 0.652 | Plastic | 1.544 | 55.9 | 4.35 |
| 7 | | −2.748 | (ASP) | 0.186 | | | | |
| 8 | Lens 4 | −1.286 | (ASP) | 0.373 | Plastic | 1.640 | 23.3 | −4.67 |
| 9 | | −2.511 | (ASP) | 0.050 | | | | |
| 10 | Lens 5 | 1.676 | (ASP) | 0.270 | Plastic | 1.544 | 55.9 | 5.16 |
| 11 | | 3.919 | (ASP) | 0.523 | | | | |
| 12 | Lens 6 | 1.857 | (ASP) | 0.506 | Plastic | 1.544 | 55.9 | −9.59 |
| 13 | | 1.238 | (ASP) | 0.492 | | | | |
| 14 | IR-cut filter | Plano | | 0.200 | Glass | 1.517 | 64.2 | — |
| 15 | | Plano | | 0.517 | | | | |
| 16 | Image | Plano | | — | | | | |

Reference wavelength (d-line) is 587.6 nm

TABLE 20

Aspheric Coefficients

| | Surface # | | | | | |
|---|---|---|---|---|---|---|
| | 1 | 2 | 4 | 5 | 6 | 7 |
| k = | −9.4407E−01 | 2.8512E+00 | −6.5533E−01 | −2.6135E+00 | 3.0000E+00 | 3.0000E+00 |
| A4 = | 3.0777E−02 | −4.4676E−01 | −6.3042E−01 | −2.0811E−01 | −7.4247E−02 | −1.5479E−01 |
| A6 = | 1.8068E−02 | 1.3437E+00 | 1.2369E+00 | 2.4731E−01 | 3.9923E−02 | −4.1921E−02 |
| A8 = | 4.1582E−02 | −2.2546E+00 | −1.9130E+00 | −2.9877E−02 | −2.1904E−01 | 1.4306E−01 |
| A10 = | −5.2844E−02 | 2.1341E+00 | 1.6758E+00 | −4.6744E−02 | 4.0888E−01 | −1.3351E−01 |
| A12 = | 3.6383E−02 | −8.5359E−01 | −7.2522E−01 | 5.1092E−01 | −5.2953E−01 | 3.4684E−02 |
| A14 = | | | | −2.0727E−01 | 1.8045E−01 | −5.0428E−03 |

| | Surface # | | | | | |
|---|---|---|---|---|---|---|
| | 8 | 9 | 10 | 11 | 12 | 13 |
| k = | −3.5404E+00 | −9.3943E−02 | −9.8789E+00 | 3.0000E+00 | — | −3.9130E+00 |
| A4 = | −2.0544E−01 | −2.6928E−01 | 7.8826E−02 | 1.7557E−01 | −1.9002E−01 | −1.8222E−01 |
| A6 = | −2.6309E−02 | 3.6489E−01 | −1.9025E−01 | −3.8131E−01 | 3.5324E−02 | 9.7623E−02 |
| A8 = | 5.8376E−01 | −2.2565E−01 | 9.2275E−02 | 3.0878E−01 | 1.8523E−02 | −4.2574E−02 |
| A10 = | −7.6800E−01 | 1.0200E−01 | −3.0406E−02 | −1.7157E−01 | −1.0336E−02 | 1.2934E−02 |
| A12 = | 4.8358E−01 | −2.7055E−02 | −9.2850E−04 | 6.0698E−02 | 2.2036E−03 | −2.4524E−03 |

TABLE 20-continued

| Aspheric Coefficients | | | | | |
|---|---|---|---|---|---|
| A14 = | −1.2460E−01 | 3.5699E−03 | 2.3757E−03 | −1.1501E−02 | −2.3069E−04 | 2.5592E−04 |
| A16 = | | | | 8.6055E−04 | 9.7129E−06 | −1.1161E−05 |

In the optical image lens system according to the 10th embodiment, the definitions of f, Fno, HFOV, V4, V5, R5, R6, R9, f1, f2, f3, f4, and FOV are the same as those stated in the 1st embodiment with corresponding values for the 10th embodiment. Moreover, these parameters can be calculated from Table 19 and Table 20 as the following values and satisfy the following, relationships:

| f (mm) | 3.69 | $|f/f1| + |f/f2|$ | 0.48 |
|---|---|---|---|
| Fno | 2.05 | f/f2 | 0.03 |
| HFOV (deg.) | 37.8 | f3/f2 | 0.04 |
| V4/V5 | 0.42 | f/f4 | −0.79 |
| (R5 + R6)/(R5 − R6) | 0.70 | FOV (deg.) | 75.6 |
| R9/f | 0.45 | | |

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An optical image lens system comprising, in order from an object side to an image side:
    a first lens element with positive refractive power having a convex object-side surface and a concave image-side surface;
    a second lens element having positive refractive power;
    a third lens element having positive refractive power;
    a fourth lens element having negative refractive power;
    a fifth lens element with positive refractive power made of plastic, and having a convex object-side surface and a concave image-side surface, wherein the object-side surface and the image-side surface of the fifth lens element are aspheric; and
    a sixth lens element with negative refractive power made of plastic, and having a concave image-side surface, wherein the image-side surface of the sixth lens element changes from concave at a paraxial region to convex at a peripheral region, and an object-side surface and the image-side surface of the sixth lens element are aspheric;
    wherein the optical image lens system has a total of six lens elements with refractive power, a maximal field of view of the optical image lens system is FOV, and the following relationship is satisfied:

70 degrees<FOV<100 degrees.

2. The optical image lens system of claim 1, wherein the fourth lens element has a concave object-side surface and a convex image-side surface.

3. The optical image lens system of claim 1, wherein a focal length of the optical image lens system is f, a focal length of the first lens element is f1, a focal length of the second lens element is f2, and the following relationship is satisfied:

$0<|f/f1|+|f/f2|<1.3$.

4. The optical image lens system of claim 1, wherein the first lens element through the sixth lens element are meniscus lens elements at a paraxial region thereof.

5. The optical image lens system of claim 1, wherein the second lens element has an image-side surface being concave at a paraxial region and being convex at a peripheral region.

6. The optical image lens system of claim 1, wherein the refractive power of the sixth lens element is stronger than the refractive power of the lens element.

7. An optical image lens system comprising, in order from an object side to an image side:
    a first lens element with positive refractive power having a convex object-side surface;
    a second lens element having positive refractive power;
    a third lens element with positive refractive power having a convex image-side surface;
    a fourth lens element having negative refractive power;
    a fifth lens element with positive refractive power made of plastic, and having a convex object-side surface and a concave image-side surface, wherein the object-side surface and the image-side surface of the fifth lens element are aspheric; and
    a sixth lens element with negative refractive power made of plastic, and having a concave image-side surface, wherein the image-side surface of the sixth lens element changes from concave at a paraxial region to convex at a peripheral region, and an object-side surface and the image-side surface of the sixth lens element are aspheric;
    wherein the optical image lens system has a total of six lens elements with refractive power, a maximal field of view of the optical image lens system is FOV, and the following relationship is satisfied:

70 degrees<FOV<100 degrees.

8. The optical image lens system of claim 7, wherein a curvature radius of an object-side surface of the third lens element is R5, a curvature radius of the image-side surface of the third lens element is R6, and the following relationship is satisfied:

$0<(R5+R6)/(R5-R6)<3.2$.

9. The optical image lens system of claim 7, wherein an Abbe number of the fourth lens element is V4, an Abbe number of the fifth lens element is V5, and the following relationship is satisfied:

$0.20<V4/V5<0.60$.

10. The optical image lens system of claim 7, wherein each of the first lens element, the second lens element, the third lens element, the fourth lens element, the fifth lens element and the sixth lens element is a single and non-cemented lens element.

11. The optical image lens system of claim 7, further comprising:
    an aperture stop located between an imaged object and the first lens element.

12. The optical image lens system of claim 7, wherein a central thickness of the third lens element is thicker than a central thickness of the fourth lens element.

13. An optical image lens system comprising, in order from an object side to an image side:
   a first lens element with positive refractive power having a convex object-side surface;
   a second lens element with positive refractive power having a convex object-side surface;
   a third lens element having positive refractive power;
   a fourth lens element having negative refractive power;
   a fifth lens element with positive refractive power made of plastic, and having a convex object-side surface and a concave image-side surface, wherein the object-side surface and the image-side surface of the fifth lens element are aspheric; and
   a sixth lens element with negative refractive power made of plastic, and having a concave image-side surface, wherein the image-side surface of the sixth lens element changes from concave at a paraxial region to convex at a peripheral region, and an object-side surface and the image-side surface of the sixth lens element are aspheric;
   wherein the optical image lens system has a total of six lens elements with refractive power, a maximal field of view of the optical image lens system is FOV, and the following relationship is satisfied:

70 degrees<FOV<100 degrees.

14. The optical image lens system of claim 13, wherein a focal length of the optical image lens system is f, a focal length of the fourth lens element is f4, and the following relationship is satisfied:

$-1.90 < f/f4 < -0.55$.

15. The optical age lens system of claim 13, wherein an axial distance between the fifth lens element and the sixth lens element is larger than an axial distance between the first lens element and the second lens element, an axial distance between the second lens element and the third lens element, an axial distance between the third lens element and the fourth lens element, and an axial distance between the fourth lens element and the fifth lens element.

16. The optical image lens system of claim 13, wherein a focal length of the optical image lens system is f a curvature radius of the object-side surface of the fifth lens element is R9, and the following relationship is satisfied:

$0 < R9/f < 0.8$.

17. An optical image lens system comprising, in order from an object side to an image side:
   a first lens element with positive refractive power having a convex object-side surface;
   a second lens element having positive refractive power;
   a third lens element having positive refractive power;
   a fourth lens element having negative refractive power;
   a fifth lens element with positive refractive power made of plastic, and having a convex object-side surface and a concave image-side surface, wherein the object-side surface and the image-side surface of the fifth lens element are aspheric; and
   a sixth lens element with negative refractive power made of plastic, and having a concave image-side surface, wherein the image-side surface of the sixth lens element changes from concave at a paraxial region to convex at a peripheral region, and an object-side surface and the image-side surface of the sixth lens element are aspheric;
   wherein the optical image lens system has a total of six lens elements with refractive power; each of the first lens element, the second lens element, the third lens element, the fourth lens element, the fifth lens element and the sixth lens element is a single and non-cemented lens element; a maximal field of view of the optical image lens system is FOV, and the following relationship is satisfied:

70 degrees<FOV<100 degrees.

18. The optical image lens system of claim 17, wherein the maximal field of view of the optical image lens system is FOV, and the following relationship is satisfied:

75.6 degrees<FOV<100 degrees.

19. The optical image lens system of claim 17, wherein the object-side surface of the fifth lens element changes from convex at a paraxial region to concave at a peripheral region, and the image-side surface of the fifth lens element changes from concave at a paraxial region to convex at a peripheral region.

20. The optical image lens system of claim 17, further comprising:
   an aperture stop located between an imaged object and the second lens element.

21. The optical image lens system of claim 17, wherein a central thickness of the third lens element is the thickest among a central thickness of each of the first en e ent, the second lens element, the third lens element the fourth lens element, the fifth lens element and the sixth lens element.

* * * * *